US012355504B2

(12) United States Patent
Goto et al.

(10) Patent No.: US 12,355,504 B2
(45) Date of Patent: Jul. 8, 2025

(54) TERMINAL APPARATUS AND METHOD

(71) Applicant: SONY GROUP CORPORATION, Tokyo (JP)

(72) Inventors: Jungo Goto, Tokyo (JP); Yasuo Kubo, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 601 days.

(21) Appl. No.: 17/310,047

(22) PCT Filed: Jan. 23, 2019

(86) PCT No.: PCT/JP2019/002040
§ 371 (c)(1),
(2) Date: Jul. 13, 2021

(87) PCT Pub. No.: WO2020/152803
PCT Pub. Date: Jul. 30, 2020

(65) Prior Publication Data
US 2022/0038192 A1 Feb. 3, 2022

(51) Int. Cl.
*H04B 17/318* (2015.01)
*H04B 17/23* (2015.01)
*H04B 17/29* (2015.01)
*H04W 24/10* (2009.01)

(52) U.S. Cl.
CPC .......... *H04B 17/318* (2015.01); *H04B 17/23* (2015.01); *H04B 17/29* (2015.01); *H04W 24/10* (2013.01)

(58) Field of Classification Search
CPC ...... H04B 17/318; H04B 17/23; H04B 17/29; H04B 17/309; H04W 24/10
See application file for complete search history.

(56) References Cited

U.S. PATENT DOCUMENTS

| | | | | |
|---|---|---|---|---|
| 6,448,938 | B1 * | 9/2002 | Chiang | H01Q 21/0018 343/853 |
| 2006/0068699 | A1 * | 3/2006 | Lee | H04H 20/02 455/422.1 |
| 2012/0114057 | A1 * | 5/2012 | Nakatake | H04B 17/12 375/267 |

(Continued)

FOREIGN PATENT DOCUMENTS

| | | |
|---|---|---|
| CN | 102638292 A | 8/2012 |
| CN | 104467910 A | 3/2015 |

(Continued)

OTHER PUBLICATIONS

International Search Report and Written Opinion of PCT Application No. PCT/JP2019/002040, issued on Mar. 19, 2019, 11 pages of ISRWO.

(Continued)

*Primary Examiner* — Luat Phung
(74) *Attorney, Agent, or Firm* — CHIP LAW GROUP

(57) ABSTRACT

A terminal apparatus including one or more antenna modules, and a control unit that controls a process for changing a receivable direction of the antenna module used for measurement while fixing a shield state of the antenna module as a state produced by a shield, and a process for measuring downlink communication quality according to the change of the receivable direction of the antenna module used for the measurement.

19 Claims, 10 Drawing Sheets

(56) References Cited

U.S. PATENT DOCUMENTS

| | | | |
|---|---|---|---|
| 2012/0208458 A1 | 8/2012 | Iwasaki et al. | |
| 2013/0267181 A1 | 10/2013 | Ayatollahi | |
| 2014/0349715 A1* | 11/2014 | Sasaki | H04N 21/485 |
| | | | 455/566 |
| 2017/0179592 A1 | 6/2017 | Anderson | |
| 2018/0248610 A1* | 8/2018 | Faerber | H04B 7/086 |
| 2018/0302138 A1* | 10/2018 | Shirakata | G01S 3/02 |

FOREIGN PATENT DOCUMENTS

| | | |
|---|---|---|
| CN | 107733534 A | 2/2018 |
| CN | 107911534 A | 4/2018 |
| CN | 108604921 A | 9/2018 |
| CN | 109217881 A | 1/2019 |
| EP | 2487805 A1 | 8/2012 |
| EP | 3416301 A1 | 12/2018 |
| EP | 3570464 A1 | 11/2019 |
| JP | 2002-135198 A | 5/2002 |
| JP | 2012-169752 A | 9/2012 |
| JP | 2015-061172 A | 3/2015 |
| WO | 2017/138051 A1 | 8/2017 |
| WO | 2017/169016 A1 | 10/2017 |
| WO | WO-2018155844 A1 | 8/2018 |

OTHER PUBLICATIONS

Office Action for CN Patent Application No. 201980089286.6, issued on Sep. 27, 2024, 02 pages of English Translation and 09 pages of Office Action.

* cited by examiner

FIG. 2
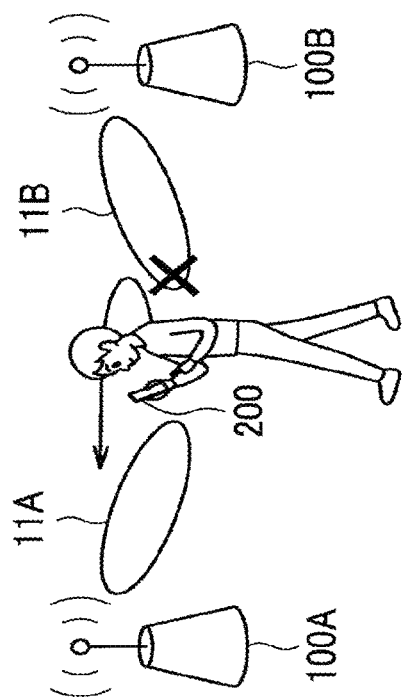
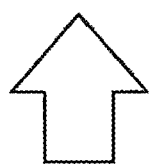
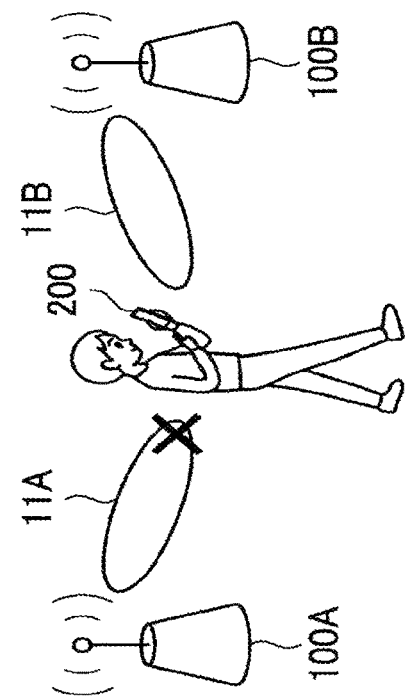

FIG. 8
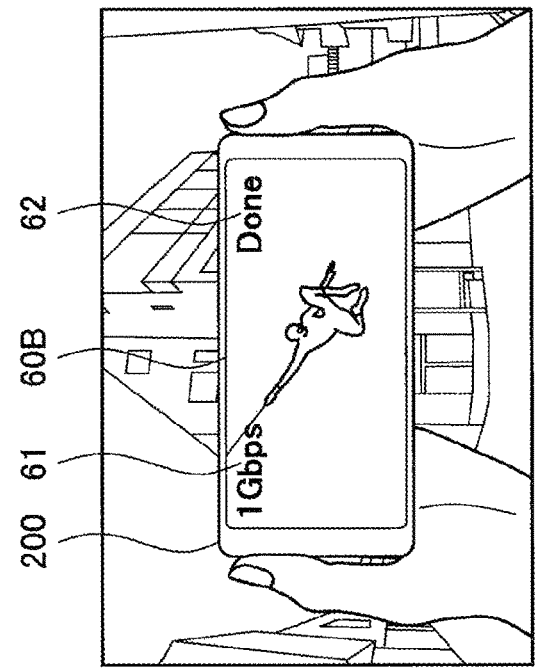
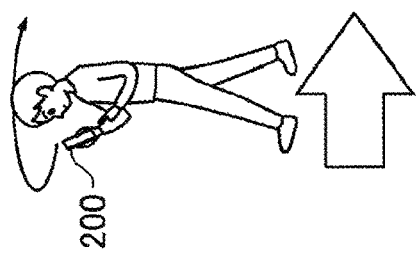
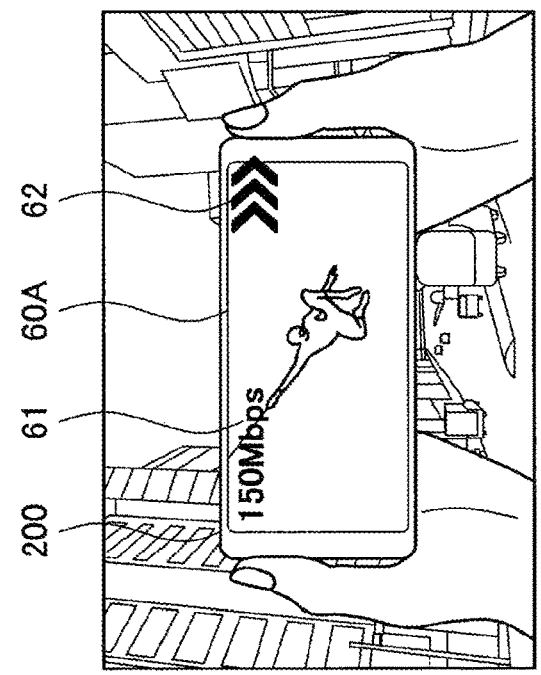

TERMINAL APPARATUS AND METHOD

CROSS REFERENCE TO RELATED APPLICATIONS

This application is a U.S. National Phase of International Patent Application No. PCT/JP2019/002040 filed on Jan. 23, 2019. Each of the above-referenced applications is hereby incorporated herein by reference in its entirety.

TECHNICAL FIELD

The present disclosure relates to a terminal apparatus and a method.

BACKGROUND ART

A wireless communication environment in recent years faces a problem of an exponential data traffic increase. Accordingly, dispersion of traffic and effective utilization of a wireless resource have been attempted by providing a large number of small-cells within a macro-cell for higher network density. A technology utilizing small-cells in this manner is called small-cell enhancement. Note that a small-cell is a concept that can include various types of cell smaller than a macro-cell and arranged at a position overlapped with a macro-cell (e.g., femtocell, nanocell, picocell, and micro-cell).

Moreover, as one of wireless resource expansion measures, it has been studied to achieve large-capacity communication such as 10 to 20 Gbps for 5G by adopting broadband transfer which uses a higher frequency band than that of 4G (LTE: Long Term Evolution). However, propagation attenuation of radio waves increases in a higher frequency band. Accordingly, a coverage (communicable area) of a base station is narrower than that of a case where a low frequency band is used. Moreover, straightness of radio waves increases in a high frequency band. Accordingly, a transmission and reception device is brought into an over-the-horizon state by shielding of a shield such as a building, a human, and a vehicle. In this case, communication quality (i.e., radio wave propagation environment) can considerably deteriorate. It is therefore assumed to use a combination of a low frequency band and a high frequency band to achieve an extremely high throughput within a coverage by the high frequency band while securing a wide coverage by the low frequency band. Note that the high frequency band having a narrow coverage is expected to be used in a small-cell which is smaller than a macro-cell.

It has also been studied to use a beam (or beam pattern) to cancel the magnitude of propagation attenuation of radio waves in the high frequency band. For selecting an optimum beam to be used for communication, beam sweeping which uses a plurality of available beams for transmission or reception of a measurement signal (known signal) can be adopted. The beam formed by the transmission side is also called a transmission beam, while the beam formed by the reception side is also called a reception beam. An optimum transmission beam is selected on the basis of a measurement result of a measurement signal transmitted from the transmission side along with beam sweeping. This procedure is also called transmission beam sweeping. Moreover, an optimum reception beam is selected on the basis of a measurement result obtained at the time of reception of a measurement signal received by the reception side along with beam sweeping. This procedure is also called reception beam sweeping. PTL 1 presented below discloses a technology associated with reception beam sweeping, i.e., a technology which sequentially sets antenna directivity in all directions in a horizontal plane of a portable terminal to measure reception levels in the respective directions.

CITATION LIST

Patent Literature

[PTL 1]
Japanese Patent Laid-Open No. 2002-135198

SUMMARY

Technical Problem

However, the technology described in PTL 1 identified above does not consider a point that a user body can become a shield, for example. Propagation attenuation of radio waves increases particularly in a high frequency band. In this case, a measurement result in a case where a shield is present between a base station and a terminal apparatus can considerably differ from a measurement result in a case where a shield is absent therebetween.

Accordingly, the present disclosure provides a mechanism for achieving measurement which eliminates a shielding effect of a shield.

Solution to Problem

Provided according to the present disclosure is a terminal apparatus including: one or more antenna modules; and a control unit that controls a process for changing a receivable direction of the antenna module used for measurement while fixing a shield state of the antenna module as a state produced by a shield, and a process for measuring downlink communication quality according to the change of the receivable direction of the antenna module used for the measurement.

Moreover, provided according to the present disclosure is a method executed by a terminal apparatus that includes one or more antenna modules. The method includes controlling a process for changing a receivable direction of the antenna module used for measurement while fixing a shield state of the antenna module as a state produced by a shield, and a process for measuring downlink communication quality according to the change of the receivable direction of the antenna module used for the measurement.

BRIEF DESCRIPTION OF DRAWINGS

FIG. 2 is a diagram for explaining an outline of a proposed technology.

FIG. 8 is a diagram for explaining an example of second instruction information displayed by the terminal apparatus according to the present embodiment.

DESCRIPTION OF EMBODIMENT

Figure 1:
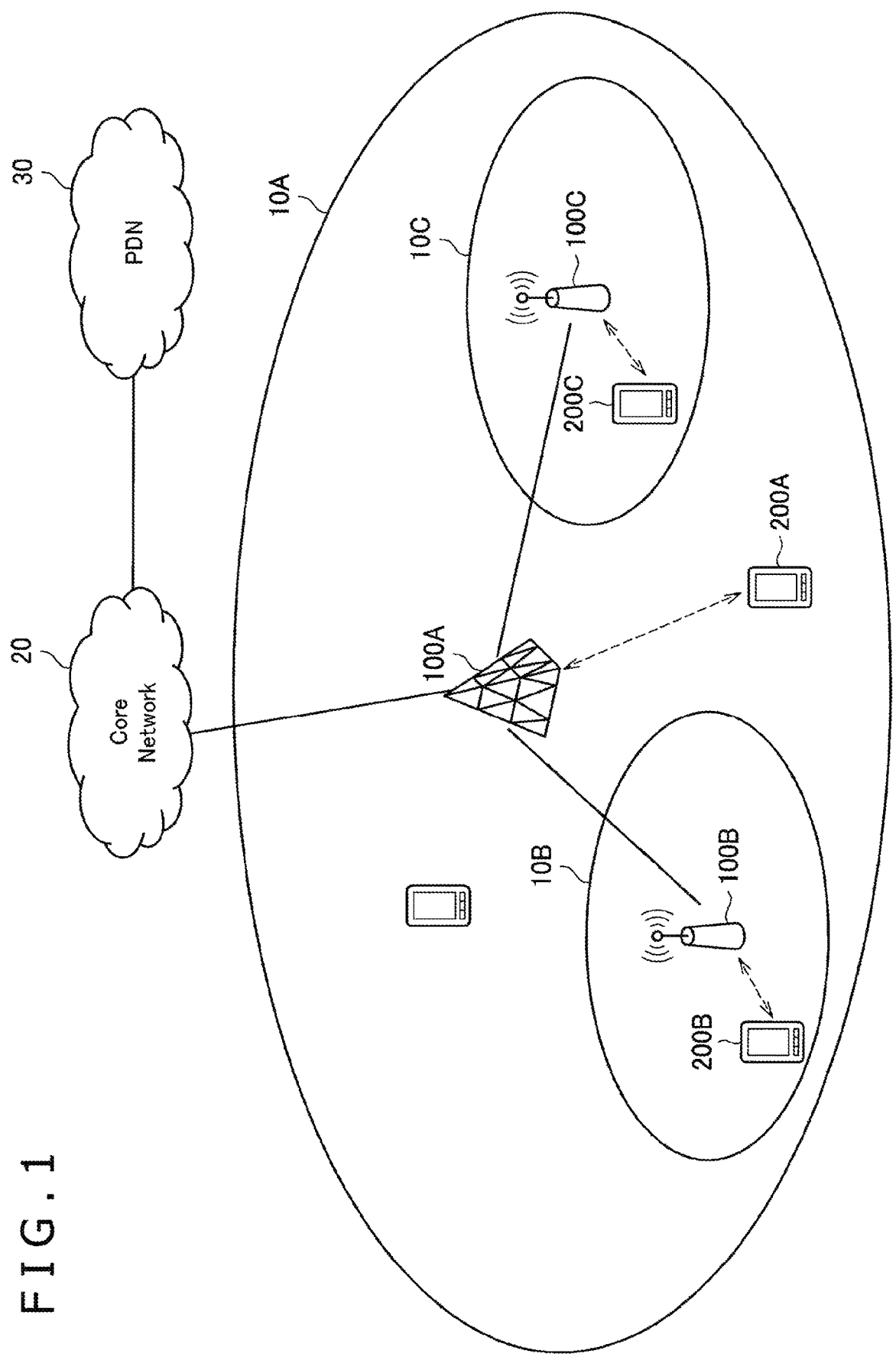
FIG. 1 is a diagram for explaining an example of a system configuration according to an embodiment of the present disclosure.

A preferred embodiment of the present disclosure will be hereinafter described in detail with reference to the accompanying drawings. Note that constituent elements having substantially identical functional configurations in the present description and the drawings are given identical reference numbers to omit repetitive explanation.

Moreover, elements having substantially identical functional configurations in the present description and the drawings are distinguished from each other by adding different alphabetical characters to ends of identical reference numbers in some cases. For example, a plurality of elements having substantially an identical functional configuration is distinguished from each other as necessary, such as terminal apparatuses 200A, 200B, and 200C. However, only identical numerical numbers are given in a case where no distinction between a plurality of elements having a substantially identical functional configuration is particularly needed. For example, in a case where no distinction between the terminal apparatuses 200A, 200B, and 200C is particularly needed, these are simply referred to as terminal apparatuses 200.

Note that description will be presented in a following order.

1. Introduction
    1.1. System configuration example
    1.2. Outline of proposed technology
2. Configuration example
    2.1. Functional configuration example
    2.2. Arrangement of antenna modules
3. Technical features
    3.1. Frequency band
    3.2. Measuring process
    3.3. User supporting process
4. Modifications
    4.1. First modification
    4.2. Second modification
5. Hardware configuration example
6. Summary 1. Introduction <1.1. System Configuration Example>

FIG. 1 is a diagram for explaining an example of a system configuration according to an embodiment of the present disclosure. As depicted in FIG. 1, a system 1 according to the present embodiment includes base stations 100 (100A to 100C), and terminal apparatuses 200 (200A to 200C).

Each of the base stations 100 is a communication apparatus which operates a cell 10 (one of 10A to 10C), and provides a wireless service for the one or more terminal apparatuses 200 located within the cell 10. For example, the base station 100A provides a wireless service for the terminal apparatus 200A, the base station 100B provides a wireless service for the terminal apparatus 200B, and the base station 100C provides a wireless service for the terminal apparatus 200C. For example, each of the cells 10 may be operated in conformity with any wireless communication system such as LTE (Long Term Evolution), LTE-A (LTE-Advanced), and 5G. In addition, it is assumed that 5G includes NR (New Radio), NRAT (New Radio Access Technology), and FEUTRA (Further Evolved Universal Terrestrial Radio Access).

The base station 100A is a macro-cell base station which operates the macro-cell 10A. The macro-cell base station 100A is connected to a core network 20. The core network 20 is connected to a packet data network (PDN) 30 via a gateway device (not depicted).

The base stations 100B and 100C are small-cell base stations operating the small-cells 10B and 10C, respectively. The small-cell base stations 100B and 100C are connected to the macro-cell base station 100A.

For example, the core network 20 can include MME (Mobility Management Entity), S-GW (Serving gateway), P-GW (PDN gateway), PCRF (Policy and Charging Rule Function), and HSS (Home Subscriber Server). Alternatively, the core network 20 can include a 5G entity having a function similar to functions of these. MME is a control node handling a signal of a control plane, and manages a mobile state of a terminal apparatus. S-GW is a control node handling a signal of a user plane, and functions as a gateway device which switches a transfer path of user data. P-GW is a control node handling a signal of a user plane, and functions as a gateway device which becomes a connection point between the core network 20 and the PDN 30. PCRF is a control node which controls policies and charges of QoS (Quality of Service) or the like for a bearer. HSS is a control node which handles subscriber data, and controls services.

Each of the terminal apparatuses 200 is a communication apparatus which wirelessly communicates with the base station 100 under control by the base station 100. Each of the terminal apparatuses 200 may be what is called a user terminal (User Equipment: UE). For example, each of the terminal apparatuses 200 transmits an uplink signal to the base station 100, and receives a downlink signal from the base station 100.

Note that the macro-cell base station 100 and the small-cell base stations 100 are hereinafter collectively referred to as the base stations 100 in a case where no distinction is needed between these base stations.

<1.2. Outline of Proposed Technology>

FIG. 2 is a diagram for explaining an outline of a proposed technology. As depicted in FIG. 2, a user holding the terminal apparatus 200 walks between the base stations 100A and 100B. The base stations 100A and 100B transmit transmission beams 11A and 11B toward the terminal apparatus 200, respectively.

In a situation depicted in a left part of FIG. 2, the user directs the terminal apparatus 200 toward the base station 100B, and has his or her back toward the base station 100A. Accordingly, the transmission beam 11B is received and not shielded, while the transmission beam 11A is shielded by the body of the user. A right part of FIG. 2 depicts a situation where the user turns around by 180 degrees in the situation depicted in the left part of FIG. 2. In the situation depicted in the right part of FIG. 2, the user directs the terminal apparatus 200 toward the base station 100A, and has his or her back toward the base station 100B. Accordingly, the transmission beam 11A is received and not shielded, while the transmission beam 11B is shielded by the body of the user. In this manner, a shield state of the transmission beams 11 changes only by turning of the user without a shift. As a result, communication quality changes.

In a case where the user changes a manner to hold the terminal apparatus 200, the shield state of the transmission beams 11 can similarly change. For example, in a case where the manner to hold the terminal apparatus 200 is changed from covering an antenna module to holding a portion away from the antenna module, the shield state of the transmission beams 11 changes. As a result, communication quality changes.

In this manner, communication quality changes according to the shield state of the transmission beams 11. Accordingly, it is difficult to eliminate a shield effect produced by the shield and achieve accurate measurement only by switching the antenna module to be used or switching the transmission beams 11.

While the transmission beams have been described above, the similar is applicable to the reception beams. In either case of transmission beam measurement and reception beam measurement, it is desirable to achieve measurement which eliminates a shield effect produced by a shield as described above, and select an optimum beam.

According to the proposed technology, therefore, the terminal apparatus 200 changes the direction of the terminal apparatus 200 while fixing a shield state of an antenna module as a state produced by a shield, and achieves measurement according to the direction change of the terminal apparatus 200. For example, the terminal apparatus 200 instructs a user to turn around at the same spot while fixing a shield state of the terminal apparatus 200 as a state produced by the user (e.g., the manner to hold the terminal apparatus 200 by the hand, the positional relationship between the body and the terminal apparatus 200, and others). At this time, the terminal apparatus 200 changes the direction of the terminal apparatus 200 while fixing such a state that the antenna module is not shielded by the shield. Then, the terminal apparatus 200 measures communication quality by performing reception beam sweeping every time the direction of the terminal apparatus 200 changes by the turn of the user. In this manner, the terminal apparatus 200 is capable of measuring communication qualities of transmission beams coming in respective directions, and reception beams traveling in respective directions in a state where the effect of the shield has been eliminated.

Moreover, according to the proposed technology, the terminal apparatus 200 compares communication qualities in respective directions in the state where the effect of the shield has been eliminated, and instructs the user to set the terminal apparatus 200 in the direction in which the best communication quality is obtained. By setting the terminal apparatus 200 in the direction in which the best communication quality is obtained in accordance with the instruction, the user can establish communication of the terminal apparatus 200 with the best communication quality at a current position.

Furthermore, according to the proposed technology, the terminal apparatus 200 may compare communication qualities at respective positions, and instruct the user to adopt a combination of a position and a direction in which the best communication quality is obtained. By shifting and setting the terminal apparatus 200 in the direction corresponding to the instruction, the user can establish communication of the terminal apparatus 200 with the best communication quality around the current position. Besides, according to the proposed technology, the terminal apparatus 200 may compare communication qualities at respective positions, and instruct the user to adopt a combination of a position and a direction in which the best communication quality is obtained, and a manner to hold the terminal apparatus 200 by the hand.

2. Configuration Example

<2.1. Functional Configuration Example>

Figure 3:
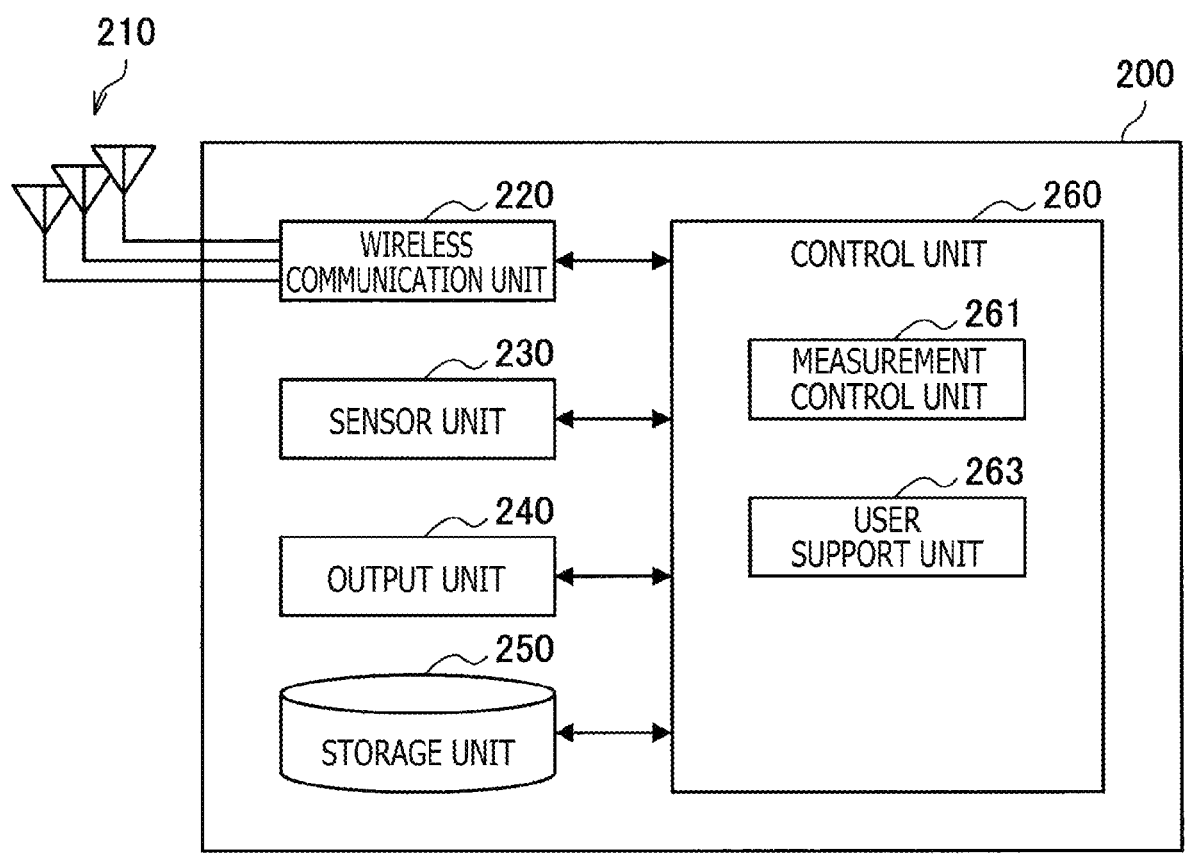
FIG. 3 is a block diagram depicting an example of a configuration of a terminal apparatus according to the present embodiment.

An example of a configuration of the terminal apparatus 200 according to the present embodiment will be subsequently described with reference to FIG. 3. FIG. 3 is a block diagram depicting an example of the configuration of the terminal apparatus 200 according to the present embodiment. Referring to FIG. 3, the terminal apparatus 200 includes antenna modules 210, a wireless communication unit 220, a sensor unit 230, an output unit 240, a storage unit 250, and a control unit 260.

Antenna Module 210

Each of the antenna modules 210 emits signals output from the wireless communication unit 220 toward a space as radio waves. Moreover, each of the antenna modules 210 converts radio waves present in the space into signals, and outputs the signals to the wireless communication unit 220.

Each of the antenna modules 210 constitutes an array antenna which has a plurality of antenna elements (e.g., a plurality of antenna elements constituting an MIMO antenna). Each of the antenna modules can include, in addition to the antenna elements, an antenna switch which switches a connection destination of each of the antenna elements between a plurality of circuits contained in the wireless communication unit 220 (e.g., circuits for different wireless communication systems, or transmission circuit or reception circuit). Moreover, each of the antenna modules 210 can include various devices accompanying the antenna elements.

Wireless Communication Unit 220

The wireless communication unit 220 transmits and receives signals. For example, the wireless communication unit 220 receives a downlink signal from a base station, and transmits an uplink signal to a base station.

Sensor Unit 230

The sensor unit 230 detects various types of information associated with the terminal apparatus 200.

The sensor unit 230 has a function as a posture information acquisition unit which acquires posture information associated with the terminal apparatus 200. For example, the posture information acquisition unit calculates and acquires posture information indicating a posture of the terminal apparatus 200 on the basis of acceleration detected by an acceleration sensor, an angular speed detected by a gyro sensor, and geomagnetism detected by a magnetic field sensor.

The sensor unit 230 has a function as a position information acquisition unit which acquires position information associated with the terminal apparatus 200. For example, the position information acquisition unit receives a GNSS (Global Navigation Satellite System) signal from a GNSS satellite (e.g., GPS (Global Positioning System) signal from a GPS satellite), detects position information constituted by a degree of latitude and a degree of longitude of the apparatus, and outputs detected position information. Note that the position information acquisition unit may detect position information using any other technologies. For example, the position information acquisition unit may detect position information by transmission and reception to and from Wi-Fi (registered trademark), a cellular phone, a PHS, a smartphone, or the like, or by near field communication or the like. Moreover, position information associated with the terminal apparatus 200 may include a degree of altitude of the terminal apparatus 200. The degree of altitude of the terminal apparatus 200 is acquired on the basis of an atmospheric pressure detected by an atmospheric pressure sensor, for example. Accordingly, the position information is a concept including not only a position in a horizontal direction but also a position in a height direction.

Output Unit 240

The output unit 240 outputs information to the user. For example, the output unit 240 includes a display device such as a display, a light emitting device such as an LED (light emitting diode), a sound output device such as a speaker, or a vibration device such as an eccentric motor. Moreover, the output unit 240 outputs an image (still image or moving image), light, sound, or vibration.

Storage Unit 250

The storage unit 250 temporarily or permanently stores programs and various types of data for operation of the terminal apparatus 200.

Control Unit 260

The control unit 260 functions as an arithmetic processor and a controller, and controls overall operations within the terminal apparatus 200 under various types of programs. For example, the control unit 260 is implemented in the form of an electronic circuit such as a CPU (Central Processing Unit) and a microprocessor. Note that the control unit 260 may include a ROM (Read Only Memory) storing programs, calculation parameters, and the like to be used, and a RAM (Random Access Memory) temporarily storing parameters or the like variable as appropriate.

The control unit 260 includes a measurement control unit 261 and a user support unit 263. The measurement control unit 261 has a function for controlling overall processes associated with measurement of a communication quality of downlink communication accompanied with reception beam sweeping. The user support unit 263 has a function for controlling a process for communication quality improvement on the basis of a measurement result obtained by the measurement control unit 261. Details of operations of these constituent elements will be described in detail below.

Note that the control unit 260 can further include constituent elements other than the above constituent elements. Accordingly, the control unit 260 can perform operations other than the operations of the above constituent elements. For example, the control unit 260 causes the wireless communication unit 220 to transmit and receive information to and from other apparatuses, causes the sensor unit 230 to detect information, and causes the output unit 240 to output information.

<2.2. Arrangement of Antenna Modules>

A receivable direction is defined according to arrangement of the antenna elements for each of the antenna modules 210. In other words, a formable reception beam direction is defined for each of the antenna modules 210.

The terminal apparatus 200 has the one or more antenna modules 210. Accordingly, the terminal apparatus 200 has one or more receivable directions. It is preferable to arrange the plurality of antenna modules 210 in the terminal apparatus 200 at different positions and in different directions so as to receive radio waves coming in a larger number of different directions. An example of arrangement of the antenna modules 210 in the terminal apparatus 200 will be described with reference to FIG. 4.

Figure 4:
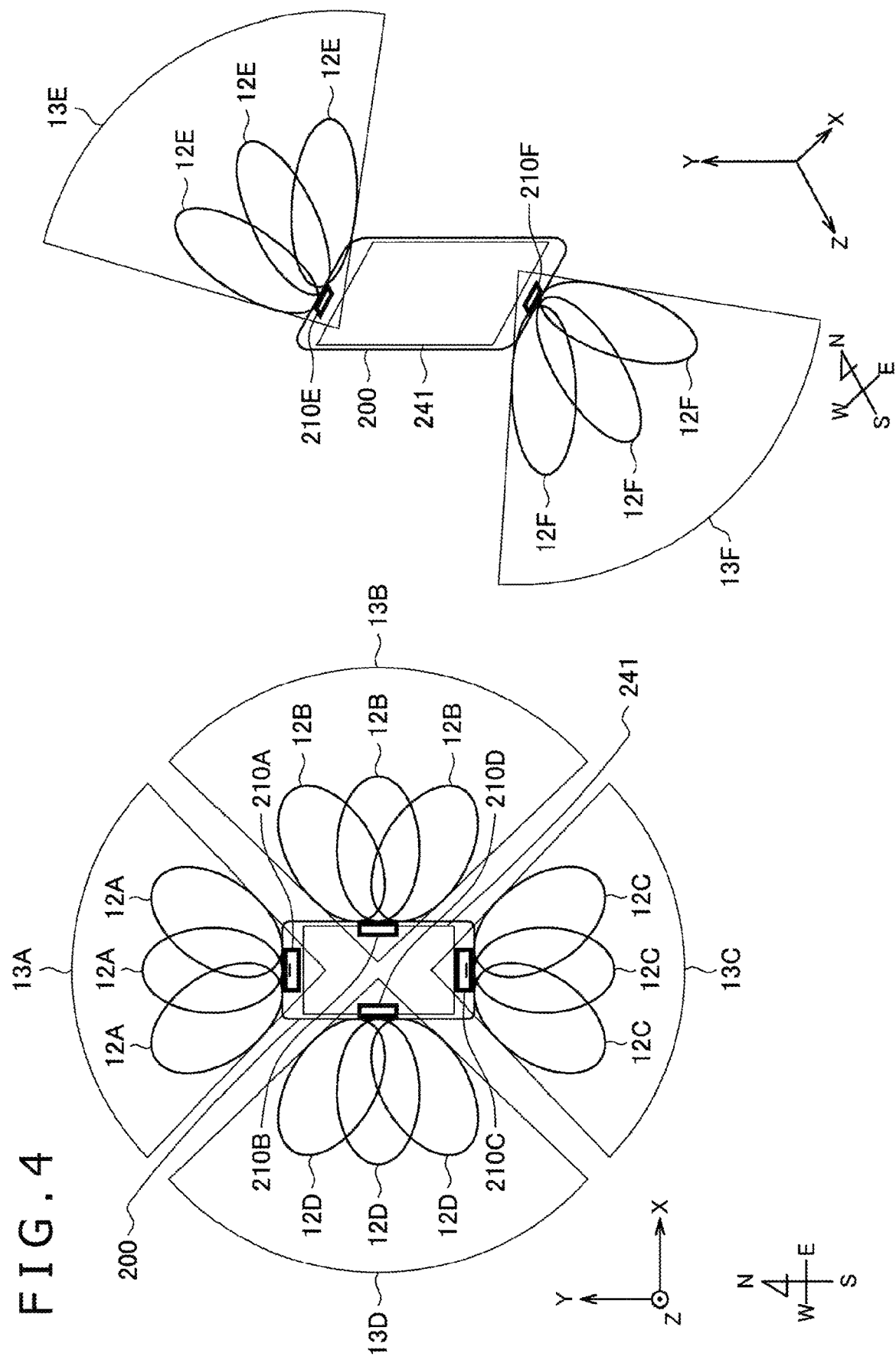
FIG. 4 is a diagram depicting an example of arrangement of antenna modules in the terminal apparatus according to the present embodiment.

FIG. 4 is a diagram depicting an example of arrangement of the antenna modules 210 in the terminal apparatus 200 according to the present embodiment. As depicted in FIG. 4, it is assumed that a display plane of a display 241 of the terminal apparatus 200 corresponds to an X-Y plane, that a long side direction of the display 241 corresponds to a Y-axis, and that a short side direction of the display 241 corresponds to an X-axis. It is further assumed that an axis perpendicular to the display 241 corresponds to a Z-axis, that a front surface side (i.e., front side) of the display 241 corresponds to a positive direction of the Z-axis, and that a rear surface side (i.e., rear side) of the display 241 corresponds to a negative direction of the Z-axis. Different postures of the terminal apparatus 200 are depicted in a left part and a right part of FIG. 4. In the left part of FIG. 4, the X-axis positive direction faces the east, the Y-axis positive direction faces the north, and that the Z-axis negative direction faces in the vertical direction. Moreover, in the right part of FIG. 4, the X-axis positive direction faces the east, the Y-axis negative direction faces in the vertical direction, and that the Z-axis positive direction faces the south.

According to the example depicted in FIG. 4, the six antenna modules 210 (210A to 210F) are provided at different positions of the terminal apparatus 200. Each of the six antenna modules 210 is capable of forming three reception beams 12 in directions different for each beam, and has a receivable direction 13 in a direction (i.e., orientation) different for each antenna module. The receivable direction 13 of each of the antenna modules 210 is a direction covered by a plurality of formable reception beams.

Specifically, as depicted in the left part of FIG. 4, the antenna module 210A is provided at an end of the terminal apparatus 200 in the Y-axis positive direction. Moreover, the antenna module 210A is capable of forming three reception beams 12A in directions different for each beam in the X-Y plane on the Y-axis positive side. The receivable direction 13A of the antenna module 210A is a direction covered by the reception beams 12A, and has a width extending east to west around the north direction in the example depicted in FIG. 4. The antenna module 210B is provided at the end of the terminal apparatus 200 in the X-axis positive direction, and is capable of forming three reception beams 12B in directions different for each beam in the X-Y plane on the X-axis positive side. A receivable direction 13B of the antenna module 210B has a width extending south to north around the east direction. The antenna module 210C is provided at the end of the terminal apparatus 200 in the Y-axis negative direction, and is capable of forming three reception beams 12C in directions different for each beam in the X-Y plane on the Y-axis negative side. A receivable direction 13C of the antenna module 210C has a width extending east to west around the south direction. The antenna module 210D is provided at the end of the terminal apparatus 200 in the X-axis negative direction, and is capable of forming three reception beams 12D in directions different for each beam in the X-Y plane on the X-axis negative side. A receivable direction 13D of the antenna module 210D has a width extending south to north around the west direction.

As depicted in the right part of FIG. 4, the antenna module 210E is provided at the end of the terminal apparatus 200 in the Y-axis positive direction, and is capable of forming three reception beams 12E in directions different for each beam in the X-Z plane on the Z-axis negative side. A receivable direction 13E of the antenna module 210E has a width extending east to west around the north direction. The antenna module 210F is provided at the end of the terminal apparatus 200 in the Y-axis negative direction, and is capable of forming three reception beams 12F in directions different for each beam in the X-Y plane on the Z-axis positive side. A receivable direction 13F of the antenna module 210F has a width extending east to west around the south direction.

In a case of a smartphone, it is assumed that beams are formable in six plane directions (positive directions and negative directions in the respective axes) as described with reference to FIG. 4. Typically, the terminal apparatus 200 measures a downlink measurement signal while switching 18 beams in total, i.e., reception beams 12A to 12F, and selects a combination of the antenna module 210 and the reception beam 12 producing the best communication quality.

In addition, an action that the receivable direction 13 of the antenna module 210 is set in a certain predetermined direction in the present description refers to an action that a center direction of the receivable direction 13 of the antenna module 210 is set in this predetermined direction.

3. Technical Features

<3.1. Frequency Band>

According to the present embodiment, a frequency band is classified into a first frequency band and a second frequency band.

The first frequency band is a frequency band higher than a predetermined frequency. The second frequency band is a frequency band lower than the predetermined frequency. For example, the predetermined frequency may be 6 GHz. In other words, the first frequency band may be a frequency band higher than 6 GHz, and the second frequency band may be a frequency band lower than 6 GHz.

In a different example, the first frequency band may be a millimeter wave band, and the second frequency band may be a microwave band. Note that the millimeter wave band is a frequency band from 30 to 300 GHz, while the microwave band is a frequency band from 300 MHz to 30 GHz. In a further different example, the first frequency band may be 26 GHz (n258), 28 GHz (n257, n261), 39 GHz (n260), and Sub6 (n77-79), and the second frequency band may be UHF (Ultra High Frequency). Note that UHF is a frequency band from 300 MHz to 3 GHz. In a still further different example, the first frequency band may be SHF (super high frequency) and EHF (extremely high frequency), and the second frequency band may be UHF. Note that SHF is a frequency band from 3 to 30 GHz, and that EHF is a frequency band from 30 to 300 GHz.

The terminal apparatus 200 measures communication quality in the first frequency band, and communicates using the first frequency band on the basis of a result of the measurement.

<3.2. Measuring Process>

On/Off of Antenna Module 210

The terminal apparatus 200 (e.g., measurement control unit 261) performs measurement in an on-state of the antenna module 210 used for measurement, and an off-state of the antenna module 210 not used for measurement. Accordingly, the terminal apparatus 200 performs reception beam sweeping using only the antenna module 210 used for measurement. Either the one or a plurality of the antenna modules 210 may be used for measurement.

The terminal apparatus 200 measures communication quality in the first frequency band. For this measurement, for example, the terminal apparatus 200 selects the antenna module 210 communicating using the first frequency band as the antenna module 210 used for measurement. In a case where the one antenna module 210 is allowed to use both the first frequency band and the second frequency band, the terminal apparatus 200 measures communication quality in the first frequency band by bringing the corresponding antenna module 210 into an on-state.

Note that following description will be presented on an assumption that the antenna module 210A is used for measurement unless otherwise specified.

Outline of Measuring Process

The terminal apparatus 200 (e.g., measurement control unit 261) controls a first process and a second process to measure communication quality in a state where an effect of a shield has been eliminated. The first process includes a process for achieving a posture change of the terminal apparatus 200. The second process includes measurement accompanied with reception beam sweeping.

First Process

The first process is a process for changing the receivable direction 13 of the antenna module 210 used for measurement while fixing a shield state of the antenna module 210 as a state produced by a shield. Changing the receivable direction 13 of the antenna module 210 used for measurement is equivalent to changing the direction (i.e., posture) of the terminal apparatus 200. It is preferable that the change of the receivable direction 13 of the antenna module 210 is performed in a discrete manner, such as a change for every 30 degrees of 360 degrees in the horizontal direction. This manner attempts reduction of a load produced by the change. Moreover, the change of the receivable direction 13 of the antenna module 210 may be made for 180 degrees in the vertical direction as well as 360 degrees in the horizontal direction.

The receivable direction 13 of the antenna module 210 used for measurement will be also referred to as a measurable direction in the following description. The measurable direction changes according to the posture of the terminal apparatus 200, and arrangement of the antenna module 210 in the terminal apparatus 200. Accordingly, the terminal apparatus 200 recognizes the measurable direction on the basis of the arrangement of the antenna module 210 used for measurement, and posture information associated with the terminal apparatus 200.

The shield state of the antenna module 210 as a state produced by the shield is also considered as a relative positional relationship between the shield and the antenna module 210. For example, the shield is the body of the user of the terminal apparatus 200. For example, the shield state of the antenna module 210 as a state produced by the shield is defined by a manner to hold the terminal apparatus 200 by the hand. In a case where the terminal apparatus 200 is held in such a state that a portion provided with the antenna module 210 is covered by the hand, the corresponding antenna module 210 is shielded by the hand of the user. In a different example, the shield state of the antenna module 210 as a state produced by the shield is defined by a positional relationship between the body of the user and the antenna module 210. In a case where the body of the user is located in the measurable direction of the antenna module 210, the antenna module 210 is shielded by the body of the user.

The terminal apparatus 200 performs a process for changing the measurable direction while fixing a state where the shield is not located in the measurable direction. In one example, the state where the shield is not located in the measurable direction is a state of holding in a condition where the portion including the antenna module 210 used for measurement is not covered by the hand. In another example, the state where the shield is not located in the measurable direction is a state where the body of the user is not located in the measurable direction. Specifically, in a case where the antenna module 210A is used for measurement, the state where the shield is not located in the measurable direction is a state where the end of the terminal apparatus 200 in the Y-axis negative direction is held in front of the body of the user with alignment between the X-Y plane of the terminal apparatus 200 and the horizontal plane. This process achieves measurement of communication quality in any direction in the state where the shield is not located in the measurable direction in the second process.

More specifically, the terminal apparatus 200 outputs, from the output unit 240, first instruction information for instructing the user to change the measurable direction while fixing the shield state of the antenna module 210 used for measurement. For example, the first instruction information includes information for giving an instruction of a manner to hold the terminal apparatus 200, and information for giving an instruction of a change of the measurable direction while fixing the manner of holding, i.e., an instruction of a change of the direction of the terminal apparatus 200. The user changes the measurable direction while fixing the shield state of the antenna module 210 used for measurement with reference to the first instruction information. For example, the user rotates the terminal apparatus 200 in front of the body of the user without changing the position of the terminal apparatus 200 while holding the end of the terminal apparatus 200 in the Y-axis negative direction with alignment between the X-Y plane of the terminal apparatus 200 and the horizontal plane. This rotation action changes the measurable direction. The first instruction information allows the user to efficiently change the measurable direction. An example of the first instruction information will be described with reference to FIG. 5.

Figure 5:
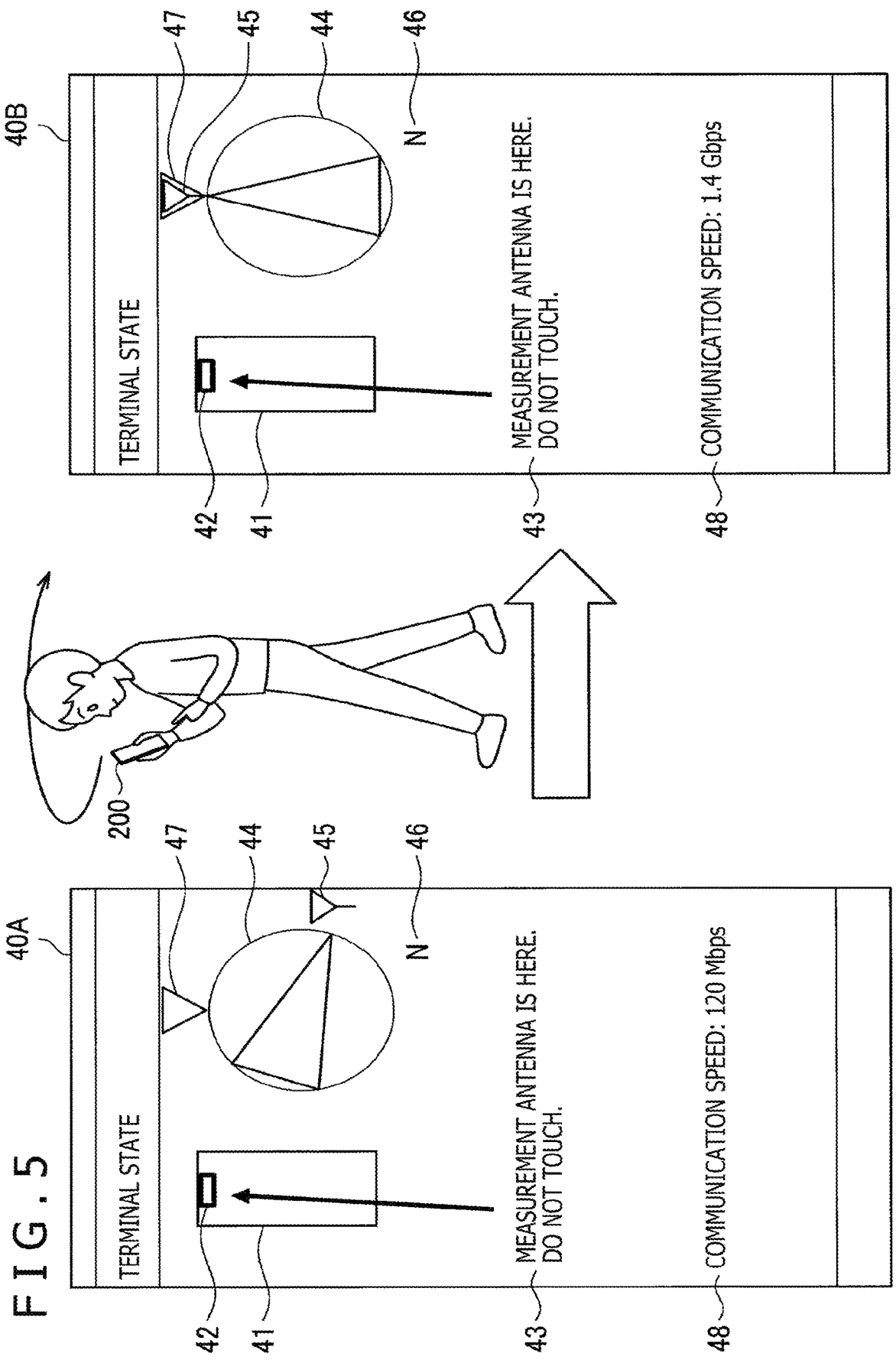
FIG. 5 is a diagram for explaining an example of first instruction information displayed by the terminal apparatus according to the present embodiment.

FIG. 5 is a diagram for explaining an example of the first instruction information displayed by the terminal apparatus 200 according to the present embodiment. Measurement screens 40 (40A and 40B) depicted in FIG. 5 are presented as an example of the first instruction information. Each of the measurement screens 40 is a screen for supporting measurement, and displayed by the output unit 240 of the terminal apparatus 200.

As depicted in FIG. 5, the measurement screen 40A includes a UI (User Interface) element 41 which indicates a complete view of the terminal apparatus 200 viewed in the Z-axis negative direction from the Z-axis positive side. Moreover, the measurement screen 40A includes a UI element 42 which is information indicating arrangement of the antenna module 210 in the terminal apparatus 200. The UI element 42 is superimposed on the UI element 41, and indicates a position of the antenna module 210A in the complete view of the terminal apparatus 200 viewed from the Z-axis positive side. The measurement screen 40A may further include UI elements indicating arrangement of the antenna modules 210B to 210F depicted in FIG. 4. The UI element 42 allows the user to recognize arrangement of the antenna module 210 invisible from the outside.

The measurement screen 40A includes a UI element 43 which is information indicating the antenna module 210A used for measurement. Shielding of the antenna module 210A used for measurement by a shield should be avoided. Accordingly, the UI element 43 includes a text describing that shielding of the antenna module 210A indicated using the UI element 42 by a shield should be avoided. The UI element 43 allows the user to easily recognize that shielding of the antenna module 210A should be avoided. In this manner, measurement which eliminates an effect of the body of the user can be achieved. In addition, for example, in a case where the terminal apparatus 200 is constituted by a plurality of openable and closable housings, the measurement screen 40A may include information for giving an instruction of an opening or closing state to be maintained during measurement. In this manner, measurement which eliminates an effect of the housings can be achieved. The UI elements 41 to 43 are presented as an example of information for giving an instruction of the manner to hold the terminal apparatus 200.

The measurement screen 40A includes UI elements 44 to 47 each constituting information associated with the measurable direction. The UI elements 44 to 47 are presented as an example of information for giving an instruction of a direction change of the terminal apparatus 200. The UI element 44 is information indicating a measurable direction. A direction of an acute angle of a triangle within a circle indicates the measurable direction. The UI element 45 is an icon indicating the measurable direction. The UI element 45 is disposed in the acute angle direction of the triangle within the circle of the UI element 44. When the user performs a rotation action, the triangle within the circle of the UI element 44 rotates by an amount equivalent to a rotation amount of the rotation action. According to this rotation, the UI element 45 shifts to a position before the acute angle of the triangle. The UI element 46 indicates the north direction by "N." The UI element 47 is information indicating a direction in which the measurable direction is to be set. The direction in which the measurable direction is to be set is a direction in which the measurable direction is not yet set for measurement in measurement target directions where the measurable direction is to be set for measurement (i.e., orientations). In a case where the UI element 47 is located in the direction in which the UI element 44 faces, i.e., in a case of alignment between the UI element 45 and the UI element 47, this state corresponds to a state where the measurable direction is set in a not-measured measurement target direction.

The measurement screen 40A may display a UI element 48 which indicates a throughput in a case where communication is established during measurement.

The user continues the rotation action with reference to the measurement screen 40A until the measurable direction comes to the not-measured measurement target direction. The measurement screen 40B is a screen in a state where the measurable direction comes to the not-measured measurement target direction. The measurement screen 40B includes UI elements similar to those of the measurement screen 40A. However, in the measurement screen 40B, the UI element 47 is located in the direction in which the UI element 44 faces, and the UI element 45 and the UI element 47 are aligned with each other. Accordingly, the measurable direction is set in the not-measured measurement target direction.

While the measurable direction is indicated by the direction of the acute angle of the triangle within the circle of the UI element 44 in the example depicted in FIG. 4, the mode for expressing the measurable direction is not limited to this example. For example, a rhombus may be disposed within the circle in place of the triangle to use the direction of the acute angle of the rhombus on one end side of the rhombus in the longitudinal direction for indication of the measurable direction. In a more simplified form, a UI element such as a compass may be used to indicate the measurable direction using the north pole direction of the compass. In this case, an affordance effect is expectable.

In addition, the UI element 46 is an optional element and need not be displayed.

Moreover, the measurement screen 40A may further include a UI element indicating the body of the user as another example of information for giving an instruction of the manner to hold the terminal apparatus 200. For example, the UI element indicating the position of the body of the user is disposed below the UI element 41, that is, on the side opposite to the UI element 42, and expresses that the user body should be located on the side opposite to the antenna module 210A indicated by the UI element 42. In this manner, the user is capable of holding the terminal apparatus 200 without shielding the antenna module 210A by the body of the user.

Furthermore, the measurement screen 40A may further include a UI element indicating a position to be held by the hand of the user as a further example of information for giving an instruction of the manner to hold the terminal apparatus 200. For example, the UI element indicating the position to be held by the hand of the user is disposed below the UI element 41, that is, on the side opposite to the UI element 42, and expresses that the user should hold the end of the terminal apparatus 200 by the hand on the side opposite to the antenna module 210A indicated by the UI element 42. In this manner, the user is capable of holding the terminal apparatus 200 without shielding the antenna module 210A by the hand of the user.

In addition, the first instruction information may be output as a lighting color or a blinking pattern output from a light emission device, a vibration pattern output from a vibration device, or the like as well as the display of the measurement screen 40. Besides, the measurement screen 40 depicted in FIG. 5 may be output from an external display device connected to the terminal apparatus 200 in a wired or wireless manner.

Second Process

The second process is a process for measuring downlink communication quality according to a change of the measurable direction. Specifically, the terminal apparatus 200 performs reception beam sweeping and measures communication qualities of respective reception beams when the measurable direction is changed by the first process.

The terminal apparatus 200 performs reception beam sweeping in a state where the measurable direction is set in a not-measured measurement target direction, and measures communication qualities of respective reception beams in this measurable direction. At this time, the terminal apparatus 200 measures communication qualities in the first frequency band using the antenna module 210 in the on-state.

For example, measured communication quality is RSRP (Reference Signal Received Power), RSRQ (Reference Signal Received Quality), RSSI (Received Signal Strength Indicator), S/N, CSI (Channel State Information), CQI (Channel Quality Indicator), or the like.

The terminal apparatus 200 may measure SSB (SS (synchronization signal)/PBCH (Physical broadcast channel) block) as a target. Note that SSB is a block constituted by PSS (Primary synchronization signal), SSS (Secondary synchronization signal), and PBCH. The base station 100 performs transmission beam sweeping using beams different for each SSB. SSB can be designated by TCI state (Transmission Configuration Indicator state) or SRS-SpatialRelationInfo (Sounding reference signal-SpatialRelationInfo).

The terminal apparatus 200 may measure CSI-RS (Channel-state information Reference signal) as a target. Note that CSI-RS is a measurement signal for transmission beam or reception beam of the terminal apparatus 200.

A measurement period can be set in accordance with ssb-periodicityServingCell (transmission interval of SSB set), or a periodic or semi-persistent CSI-RS transmission cycle. Note that the measurement period can be set in accordance with a sub carrier interval or a frequency band. For example, the measurement period for each of the antenna modules 210 can be made shorter as the sub carrier interval becomes longer. Moreover, the measurement period for each of the antenna modules 210 can be made shorter as the frequency band becomes higher.

The terminal apparatus 200 stores a combination of information indicating a result of measurement (hereinafter referred to as measurement result information), and information indicating a measurement environment (hereinafter referred to as measurement environment information) in a storage unit. The storage unit here may be either the storage unit 250 of the terminal apparatus 200, or a storage unit equipped in an external device such as a server on a cloud.

The measurement result information includes information indicating communication quality for each reception beam obtained as a result of reception beam sweeping. For example, the measurement result information includes information which indicates identification information associated with a reception beam and information representing communication quality of the corresponding reception beam in association with each other for each of reception beams. Moreover, the measurement result information includes information indicating a measurable direction during measurement. Specifically, the measurement result information includes a combination of information indicating a measurable direction during measurement, and information indicating communication quality for each of reception beams. On the basis of the measurement result information, it can be determined in which direction the antenna module 210 is to be set to obtain appropriate communication quality, i.e., to select a reception beam producing the best (or stable) communication quality.

The measurement environment information may include position information associated with the terminal apparatus 200 at the time of measurement. With reference to this information, it can be determined in which position and direction the antenna module 210 is to be set to obtain appropriate communication quality.

The measurement environment information may include configuration information associated with the terminal apparatus 200. The configuration information associated with the terminal apparatus 200 can include a product model number and a serial number of the terminal apparatus 200, a model number of the antenna module 210, IMEI (International Mobile Equipment Identify), and a MAC address. Note that the measurement environment information may include only the IMEI, the MAC address, and the serial number. Other items of the configuration information may be identified on the basis of the IMEI, the MAC address, and the serial number with reference to a database. Moreover, the model number of the antenna module 210 may be identified on the basis of information indicating the product model number of the terminal apparatus 200 and arrangement of the antenna module 210. For example, the arrangement of the antenna module 210 may be identified on the basis of at least either identification information associated with a reception beam used for data communication, or identification information associated with a transmission beam. Moreover, the configuration information associated with the terminal apparatus 200 can include information indicating a type of the terminal apparatus 200. For example, the type of the terminal apparatus 200 may be a device type such as "mobile device," a "stationary device," a "smartphone," and a "drone," or a use case type such as "high-speed movement" and "low-speed movement." The type of the terminal apparatus 200 may be identified on the basis of the configuration information associated with the terminal apparatus 200, such as the product model number and the serial number. With reference to the configuration information of the terminal apparatus 200, it is allowed to use a measurement result obtained from the different terminal apparatus 200 having configuration information identical or similar to that of the terminal apparatus 200 in a user support process described below.

The measurement environment information may include identification information associated with the antenna module 210 used for measurement. With reference to this information, it can be determined in which direction the antenna module 210 is to be set to obtain appropriate communication quality.

Details of Measuring Process Combining First Process and Second Process

The terminal apparatus 200 alternately performs the first process and the second process. Specifically, the terminal apparatus 200 performs measurement every time the measurable direction changes. In this manner, a combination of the measurement result information and the measurement environment information is accumulated when the measurable direction is set in each of the measurement target directions.

The terminal apparatus 200 may output information indicating progress of measurement as appropriate. An example of information indicating progress of measurement will be described with reference to FIG. 6.

Figure 6:
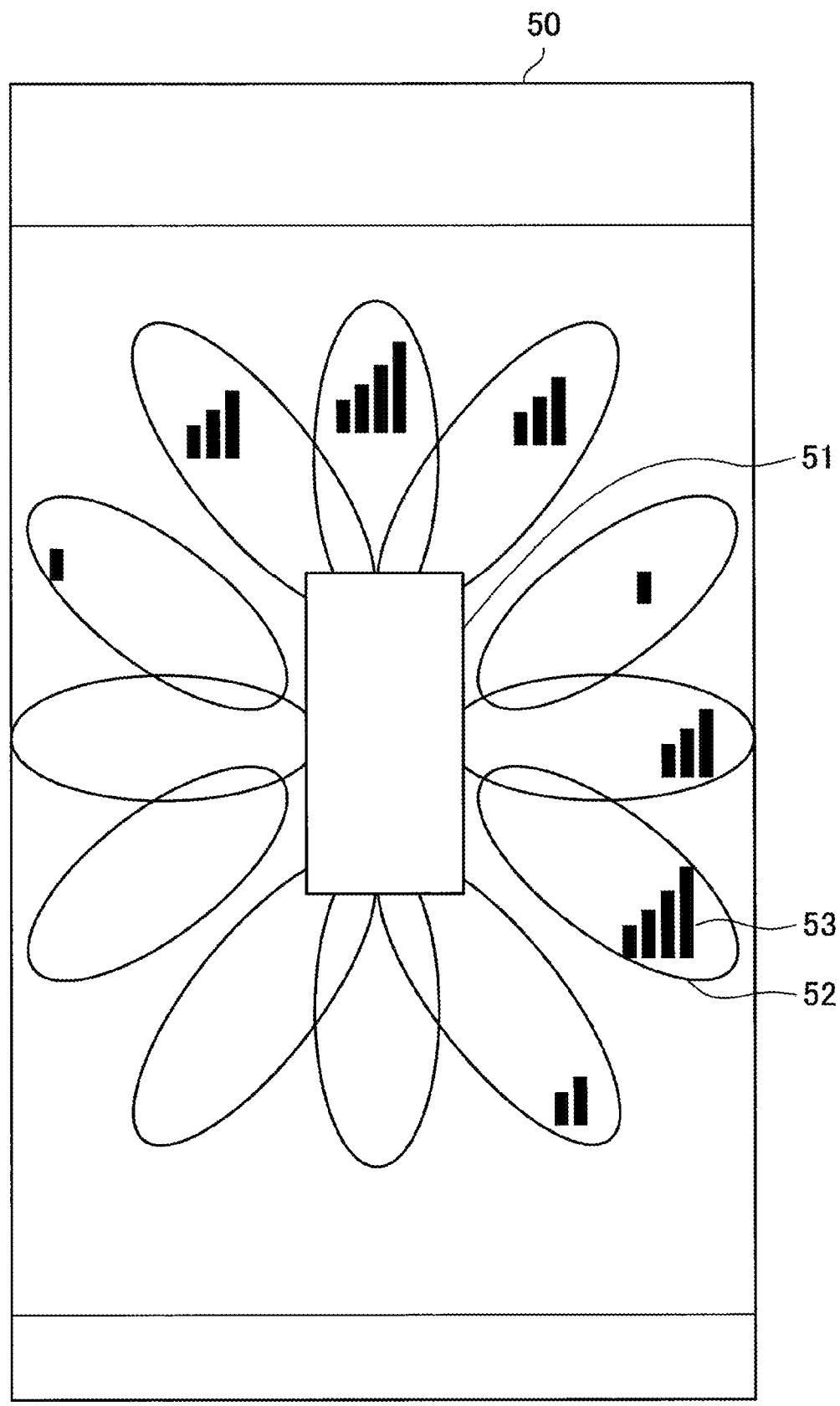
FIG. 6 is a diagram depicting an example of a measurement result display screen displayed in the terminal apparatus according to the present embodiment.

FIG. 6 is a diagram depicting an example of a measurement result display screen displayed in the terminal apparatus 200 according to the present embodiment. A measurement result display screen 50 depicted in FIG. 6 is an example of information indicating progress of measurement. As depicted in FIG. 6, the measurement result display screen 50 includes a UI element 51 which indicates a complete view when the terminal apparatus 200 is viewed from the Z-axis positive side. Moreover, the measurement result display screen 50 includes UI elements 52 each indicating a measurement target direction, and UI elements 53 each indicating a measurement result. A plurality of the UI elements 52 is radially arranged around the terminal apparatus 200. The direction of each of the radial lines indicates a measurement target direction. Each of the UI elements 53 is constituted by 0 to 4 bars each indicating a level of communication quality. A larger number of the bars indicate higher communication quality. The UI element 53 indicating a measurement result is superimposed on the UI element 52 corresponding to a measured measurement target direction in which measurement has been completed. Specifically, the UI element 52 on which the UI element 53 is superimposed indicates a measured measurement target direction, while the UI element 52 on which the UI element 53 is not superimposed indicates a not-measured measurement target direction. Note that a dead spot may be displayed to indicate a measurement target direction in which quality (radio wave intensity) necessary for communication is not obtained as a measurement result. The user can easily recognize communication qualities in respective orientations with reference to the measurement result display screen 50, and also easily recognize measured or not-measure measurement target directions.

Flow of Process

Figure 7:
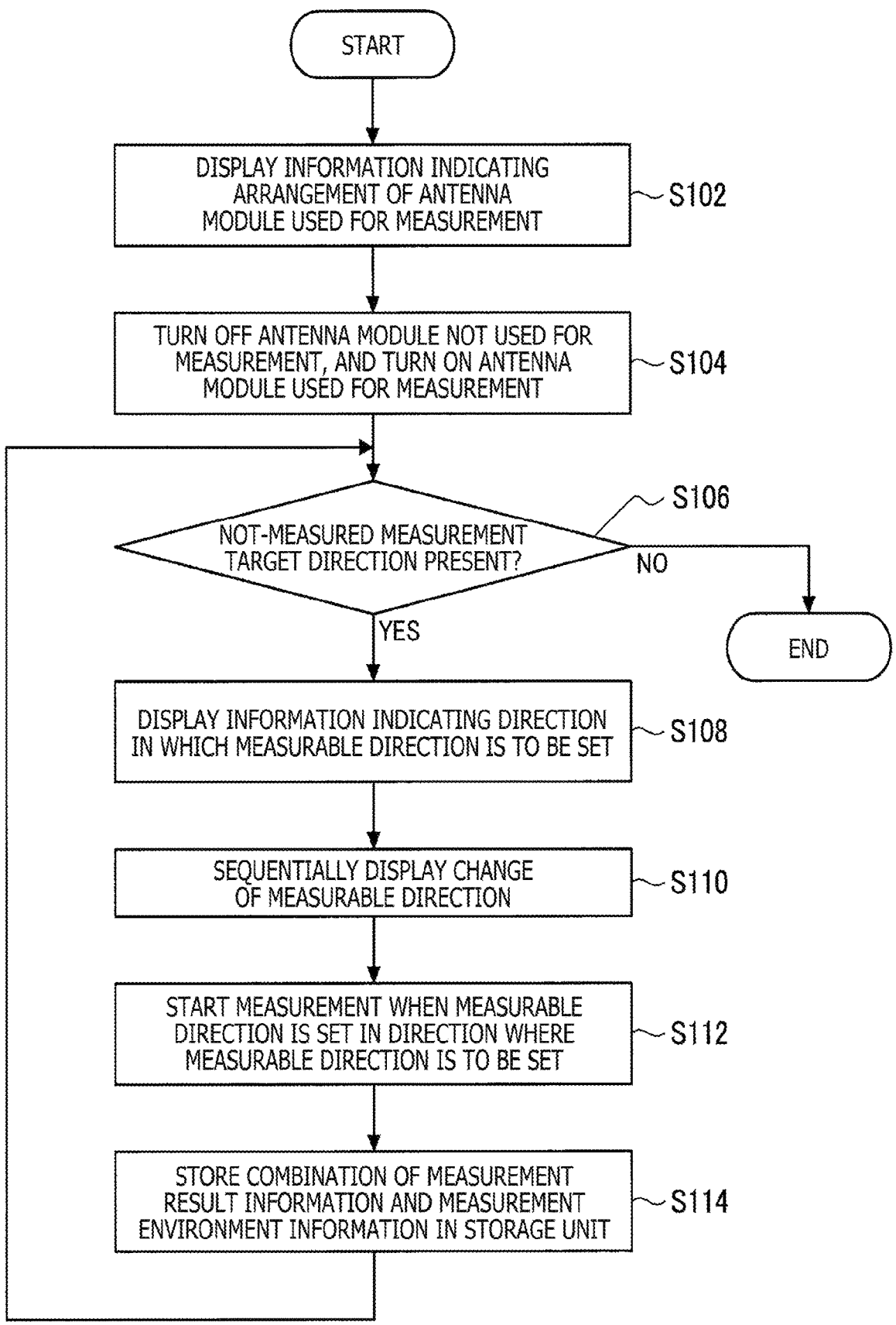
FIG. 7 is a flowchart presenting an example of a flow of a measuring process executed by the terminal apparatus according to the present embodiment.

FIG. 7 is a flowchart presenting an example of a flow of a measuring process executed by the terminal apparatus 200 according to the present embodiment. As presented in FIG. 7, the terminal apparatus 200 initially displays information indicating arrangement of the antenna modules 210 used for measurement (step S102). For example, the terminal apparatus 200 displays the UI elements 41 and 42 in the measurement screen 40 described with reference to FIG. 5. Subsequently, the terminal apparatus 200 turns off the antenna module 210 not used for measurement, and turns on the antenna module 210 used for measurement (step S104). For example, the terminal apparatus 200 turns on only the antenna module 210A, and turns off the other antenna modules 210. Subsequently, the terminal apparatus 200 determines whether or not not-measured measurement target directions are present (step S106).

In a case where not-measured measurement target directions are present (step S106: YES), the terminal apparatus 200 selects one of the not-measured measurement target directions as a direction in which the measurable direction is to be set, and displays information indicating the direction in which the measurable direction is to be set (step S108). For example, the terminal apparatus 200 displays the UI element 47 in the measurement screen 40 described with reference to FIG. 5. Subsequently, the terminal apparatus 200 sequentially displays a change of the measurable direction according to a rotation action of the user (step S110). Then, the terminal apparatus 200 starts measurement when the measurable direction is set in the direction in which the measurable direction is to be set (step S112). Next, the terminal apparatus 200 stores a combination of measurement result information and measurement environment information in the storage unit (step S114). Thereafter, the process again returns to step S106.

In a case of determination that not-measured measurement target directions are absent in step S106 (step S106: NO), the process ends.

Supplementary Explanation

Note that the example described above is the case where the antenna module used for measurement is the one antenna module 210A. However, the present technology is not limited to this example. A plurality of the antenna modules 210 may be used for measurement. In this case, measurement is performed with a plurality of the antenna modules 210 turned on, or while switching the antenna module 210 in the on state one by one.

<3.3. User Supporting Process>

The terminal apparatus 200 (e.g., user support unit 263) identifies a direction in which the receivable direction 13 of the antenna module 210 used for data communication is to be set on the basis of information stored in the storage unit. The information stored in the storage unit is a combination of measurement result information and measurement environment information. Note that a statistical process, such as a weighted average which increases a weight with nearness to average or nearest data more, may be performed for measurement result information in a case where a plurality of pieces of measurement result information associated with identical measurement environment information (e.g., position) is stored. In addition, a user supporting process may be performed on the basis of the measurement result information obtained by this statistical process.

The receivable direction 13 of the antenna module 210 used for data communication will be also referred to as a data communicable direction in the following description.

The data communicable direction changes according to the posture of the terminal apparatus 200, and arrangement of the antenna module 210 in the terminal apparatus 200. Accordingly, the terminal apparatus 200 recognizes the data communicable direction on the basis of the arrangement of the antenna module 210 used for communication, and posture information associated with the terminal apparatus 200.

A direction in which the data communicable direction is to be set will be hereinafter also referred to as a target direction.

The target direction may be a direction of preferable communication quality indicated by a measurement result. For example, the terminal apparatus 200 selects a combination of a measurable direction and a reception beam producing the best communication quality in communication qualities of respective reception beams for each of the measurable directions, and identifies the measurable direction of the selected combination as a target direction. By setting the data communicable direction in the target direction, data communication using the reception beam of the best communication quality can be achieved. Accordingly, the terminal apparatus 200 is allowed to communicate with the best communication quality.

The target direction may be a direction of less changeable communication quality indicated by a measurement result. For example, the terminal apparatus 200 selects a combination of a measurable direction and a reception beam producing the least variable communication quality in communication qualities of respective reception beams for each of the measurable directions, and identifies the measurable direction of the selected combination as a target direction. Note that the change of communication quality is a change of communication quality with time, and can be produced by an effect such as a shield by a car, a human, or the like passing between the base station 100 and the terminal apparatus 200. By setting the data communicable direction in the target direction, data communication using the reception beam producing the least variable communication quality can be achieved. Accordingly, the terminal apparatus 200 is allowed to communicate with the most stable communication quality.

The terminal apparatus 200 causes the output unit 240 to output second instruction information which includes information indicating a target direction. More specifically, the second instruction information includes information for instructing the user to change the data communicable direction and set the data communicable direction in the target direction. The user continues a rotation action until the data communicable direction comes to the target direction with reference to the second instruction information. The data communicable direction can be easily set in the target direction with reference to the second instruction information. Note that the terminal apparatus 200 selects the reception beam which produces the best communication quality or the least variable communication quality as indicated by the measurement result information, and establishes data communication using the selected reception beam when the data communicable direction is set in the target direction. Moreover, the terminal apparatus 200 establishes data communication using a transmission beam corresponding to the selected reception beam (e.g., a beam having the same pattern as that of the selected reception beam). In this manner, data communication is achievable in an environment where the best communication quality or the least variable communication quality is obtained.

For example, the second instruction information is output in a case of establishment of data communication using the first frequency band. The data communication using the first frequency band can be achieved under an application requiring a high throughput, for example. An example of the second instruction information will be described with reference to FIG. 8.

FIG. 8 is a diagram for explaining an example of the second instruction information displayed by the terminal apparatus 200 according to the present embodiment. FIG. 8 depicts a state where the terminal apparatus 200 executes a video viewing application while held sideways by the user. A video viewing screen 60A includes a UI element 61 indicating a throughput, and a UI element 62 instructing the user to change the data communicable direction. The respective UI elements 61 and 62 are superimposed on a video. The UI element 62 corresponds to the second instruction information. The UI element 62 includes right arrows ">" in a case of an instruction of a rightward rotation action, an includes left arrows "<" in a case of an instruction of a leftward rotation action. A rotation amount required to reach the target direction is indicated by the number of the arrows. A video viewing screen 60B is a screen including UI elements similar to those of the video viewing screen 60A, and is displayed when the data communicable direction reaches the target direction as a result of a rightward rotation action by the user according to the UI element 62. The UI element 62 in the video viewing screen 60B includes information "Done" which indicates that the direction has reached the target direction. Moreover, because the data communicable direction has reached the target direction, the throughput indicated by the UI element 61 improves from 150 Mbps to 1 Gbps.

Note that the second instruction information may be superimposed on a screen of AR (Augmented Reality) or VR (Virtual Reality) application, for example, instead of the video viewing application. Moreover, the second instruction information may be displayed as single information rather than superimposed on the application screen. Furthermore, the information for instructing the user to change the data communicable direction may be expressed by a color of the screen, for example, instead of the arrows indicated as the UI element 62. For example, the screen right end is displayed in red in the case of the instruction of the rightward rotation action, and the screen left end is displayed in red in the case of the instruction of the leftward rotation action. The rotation amount required to reach the target direction may be displayed by the size of the area of the red display. Moreover, the throughput indicated by the UI element 61 may be displayed only in the case where the data communicable direction has reached the target direction.

The target direction here is identified on the basis of measurement result information obtained for common measurement environment information. For example, the target direction is identified on the basis of measurement result information obtained for a common position during measurement. In other words, the target direction is identified for each position.

The second instruction information may include information for giving an instruction of a shift to a position at which the user is to be located at the time of data communication (hereinafter also referred to as target position). In this case, the target direction of the second instruction information is a direction in which the data communicable direction is to be set at the target position. For example, the target position is a position included in a shiftable zone of the user, and has a target direction indicated by a measurement result as a direction in which the best communication quality or the least variable communication quality is obtained. The shiftable zone of the user is located at a distance of several meters from a current position, for example, and may be set to any zone. The user shifts to the target position with reference to the second instruction information, and then sets the data communicable direction in the target direction. In this manner, data communication is achievable with more appropriate communication quality than communication quality produced by a simple rotation action at the current position. An example of the second instruction information including information for giving an instruction of a shift to the target position will be described with reference to FIG. 9.

Figure 9:
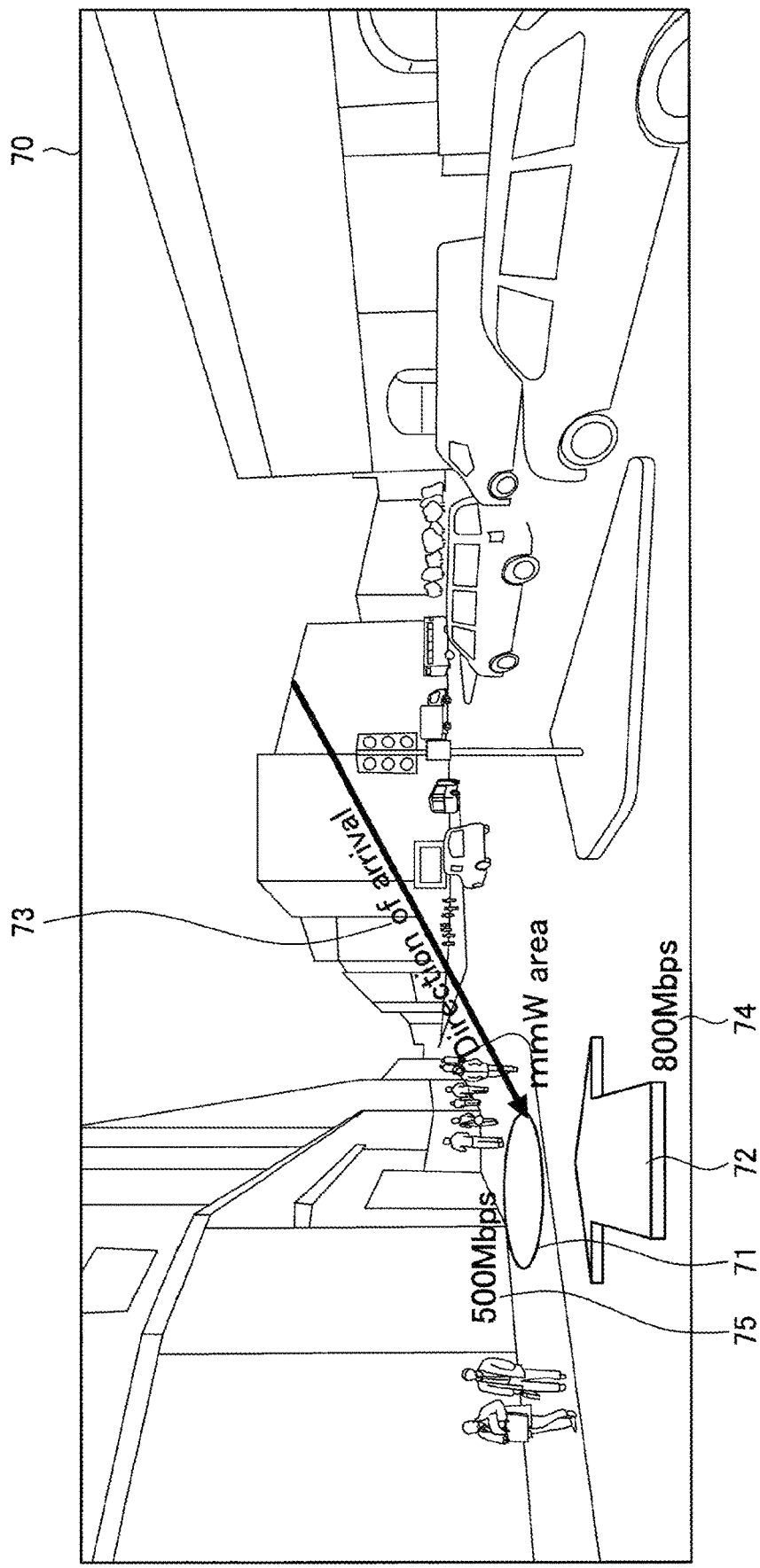
FIG. 9 is a diagram for explaining an example of the second instruction information displayed by the terminal apparatus according to the present embodiment.

FIG. 9 is a diagram for explaining an example of the second instruction information displayed by the terminal apparatus 200 according to the present embodiment. FIG. 9 depicts a state where the second instruction information is superimposed on an image 70 captured as an image of a view before the eyes of the user under an image viewing application. A UI element 71 is information indicating a target position. A UI element 72 is information for instructing the user to shift to the target position. Each of the UI elements 71 and 72 corresponds to the second instruction information. A UI element 73 is information indicating a target direction at the target position. A UI element 74 is information indicating a current throughput. A UI element 75 is information indicating a throughput obtained in a case where the data communicable direction is set in the target direction at the target position.

Note that the second instruction information may be superimposed on a screen of AR or VR application, for example, instead of the image viewing application. Moreover, the second instruction information may be displayed as single information rather than superimposed on the application screen. Furthermore, display similar to the UI elements 44 to 47 depicted in FIG. 5, or the UI element 62 depicted in FIG. 8 may be presented instead of display of the target direction using the UI element 73. In addition, the throughputs indicated by the UI elements 74 and 75 may be displayed only in a case where a shift of the user to the target position and setting of the data communicable direction in the target direction are both achieved.

Supplementary Explanation

When the data communicable direction is set in the target direction, the terminal apparatus 200 selects the reception beam which produces the best communication quality or the least variable communication quality as indicated by measurement result information, and establishes data communication using the selected reception beam.

In addition, while the antenna module 210 used for data communication and the antenna module 210 used for measurement are typically constituted by an identical antenna module, these antenna modules may be constituted by antenna modules different from each other. The terminal apparatus 200 may switch the antenna module 210 to use the antenna module 210 used for measurement also for data communication.

The second instruction information can include information for giving an instruction of a shield state of the antenna module 210 used for data communication. The information for giving an instruction of the shield state of the antenna module 210 used for data communication refers to information instructing the user not to shield the antenna module 210 used for data communication, such as information for giving an instruction of the manner to hold the terminal apparatus 200. Note that the information for giving an instruction of the manner to hold the terminal apparatus 200 may be information indicating the antenna module 210 used for data communication in a way similarly to the UI elements 41 to 43 described with reference to FIG. 5. In a different example, the information for giving the instruction of the manner to hold the terminal apparatus 200 may include information for giving an instruction of a position of the body of the user and/or information giving an instruction of a position to be held by the hand of the user. In this manner, deterioration of communication quality caused by shielding of the antenna module 210 during data communication is avoidable.

The second instruction information may be generated also on the basis of information stored in the storage unit and obtained from measurement by the different terminal apparatus 200 (i.e., a combination of measurement result information and measurement environment information). Specifically, the target direction and the target position may be identified on the basis of information obtained by measurement using a plurality of the terminal apparatuses 200. For example, a measurement result obtained by the different terminal apparatus 200 is applied to a position and a direction measured not by the terminal apparatus 200 itself to generate the second instruction information to be output from the terminal apparatus 200. It is preferable here that the different terminal apparatus 200 has configuration information identical or similar to that of the terminal apparatus 200. This is because a different measurement result may be obtained even from the same measurement environment if configuration information is different for each of the terminal apparatuses 200. The application of the measurement result described above allows identification of more appropriate target direction and target position.

For example, identification of the target direction and the target position may be achieved using machine learning such as deep learning. For example, a model which outputs a position and a direction in which the best communication quality is obtained, and a throughput in the corresponding position and direction is generated by machine learning when a position is input. By utilizing this model, estimation of a measurement result, and use of the estimated result for user support are achievable even for not-measured position and direction.

The target direction may be identified by an external device such as a server on a cloud. Moreover, the target direction may be identified beforehand, and a combination of the target direction and a measurement environment information may be stored in the storage unit. For example, a 3D map containing a target direction for each position (each position in the horizontal direction and the height direction) may be created, and supplied to the terminal apparatus 200. In addition, it is preferable to create the 3D map supplied to the terminal apparatus 200 on the basis of a measurement result obtained by the different terminal apparatus 200 having configuration information identical or similar that of the terminal apparatus 200.

4. Modifications

<4.1. First Modification>

According to the example described above, the terminal apparatus 200 is a smartphone used by the user and not having a mechanism for changing the posture by itself. However, the present technology is not limited to this example. The terminal apparatus 200 may be a device capable of autonomously changing the posture. Examples of this type of terminal apparatus 200 include a robot, a drone, and an autonomous driving car.

In this case, the terminal apparatus 200 may control the posture of the terminal apparatus 200 instead of outputting the first instruction information to change the measurable direction. In this case, the terminal apparatus 200 performs measurement while autonomously rotating.

Similarly, the terminal apparatus 200 may control the posture of the terminal apparatus 200 instead of outputting the second instruction information to change the data communicable direction up to the target direction. Moreover, the terminal apparatus 200 may shift to the target position. In this manner, appropriate communication quality can be autonomously obtained.

<4.2. Second Modification>

While the example has been described on the assumption that the instruction of the rotation action is given to the user under display of the measurement screen for measurement, the present disclosure is not limited to this example. Measurement may be performed during execution of an ordinary application. Specifically, the measuring process may be performed on the background without the necessity of giving the instruction of the rotation action to the user. In this case, the terminal apparatus 200 is capable of performing measurement without the necessity of causing the user to consciously perform the rotation action.

Moreover, for a direction in which measurement is not performed, the terminal apparatus 200 stores a combination of information indicating that measurement is not performed and measurement environment information in the storage unit. This is because a not-measured direction may be left in a case of measurement performed on the background. Furthermore, the terminal apparatus 200 stores the information indicating that measurement is not performed and the measurement environment information in the storage unit in association with each other even in a case where measurement is performed in a shielded state of the antenna module 210 used for measurement. This is required for a following reason. In a case of measurement performed on the background, the antenna module 210 used for measurement may be shielded by the user. In addition, measurement result information obtained by measurement in this condition is erroneous information from which an effect of shielding by a shield has not been eliminated.

5. Hardware Configuration Example

Figure 10:
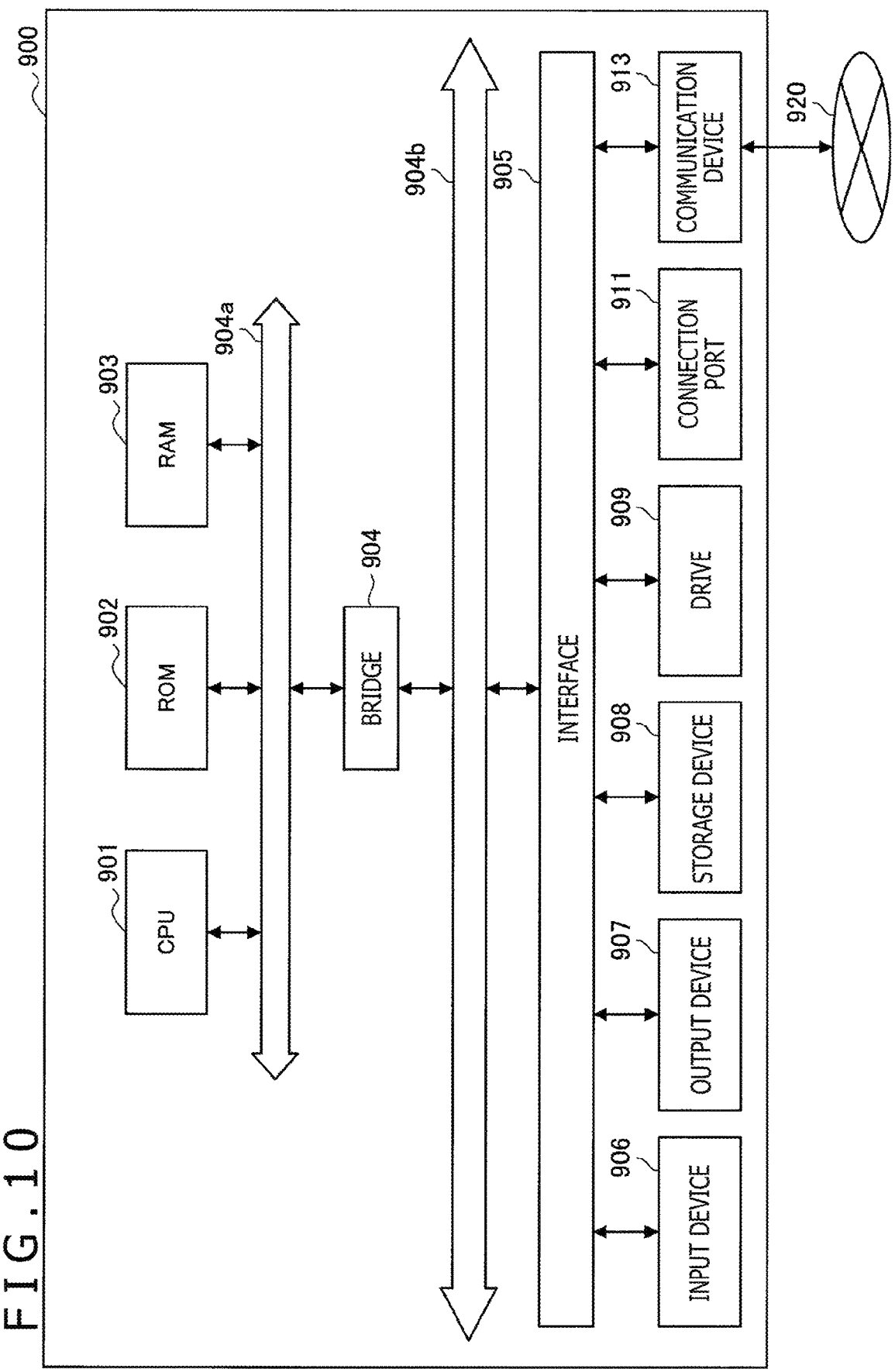
FIG. 10 is a block diagram depicting an example of a hardware configuration of an information processing apparatus according to the present embodiment.

Finally, a hardware configuration of an information processing apparatus according to the present embodiment will be described with reference to FIG. 10. FIG. 10 is a block diagram depicting an example of the hardware configuration of the information processing apparatus according to the present embodiment. Note that an information processing apparatus 900 depicted in FIG. 10 can constitute the terminal apparatus 200 depicted in FIG. 3, for example. Information processing performed by the terminal apparatus 200 according to the present embodiment is implemented by cooperative operations of software, and hardware described below.

As depicted in FIG. 10, the information processing apparatus 900 includes a CPU (Central Processing Unit) 901, a ROM (Read Only Memory) 902, a RAM (Random Access Memory) 903, and a host bus 904a. The information processing apparatus 900 further includes a bridge 904, an external bus 904b, an interface 905, an input device 906, an output device 907, a storage device 908, a drive 909, a connection port 911, and a communication device 913. The information processing apparatus 900 may include an electric circuit, and a processing circuit such as DSP and ASIC in place of or in addition to the CPU 901.

The CPU 901 functions as an arithmetic processor and a controller, and controls an overall operation within the information processing apparatus 900 under various types of programs. In addition, the CPU 901 may be a microprocessor. The ROM 902 stores programs, calculation parameters, and the like used by the CPU 901. The RAM 903 temporarily stores programs used for execution by the CPU 901, and parameters or the like variable in this execution as appropriate. For example, the CPU 901 can constitute the control unit 260 depicted in FIG. 3.

The CPU 901, the ROM 902, and the RAM 903 are connected to each other via a host bus 904a including a CPU bus or the like. The host bus 904a is connected to an external bus 904b, such as a PCI (Peripheral Component Interconnect/Interface) bus, via the bridge 904. Note that the host bus 904a, the bridge 904, and the external bus 904b are not necessarily required to be separately configured, but that functions of these may be mounted on one bus.

For example, the input device 906 is implemented by a device through which information is input from the user, such as a mouse, a keyboard, a touch panel, buttons, a microphone, switches, and levers. Moreover, for example, the input device 906 may be a remote control device using infrared light or other radio waves, or may be an external connection device, such as a cellular phone and PDA, operated in correspondence with the operation of the information processing apparatus 900. Furthermore, for example, the input device 906 may include an input control circuit or the like which generates an input signal on the basis of information input from the user using the above input means, and outputs the generated input signal to the CPU 901. The user of the information processing apparatus 900 is allowed to input various types of data to the information processing apparatus 900, and give an instruction of a processing operation to the information processing apparatus 900 by operating the input device 906.

Besides, the input device 906 can be constituted by a device which detects information associated with the user. For example, the input device 906 can include various types of sensor, such as an image sensor (e.g., camera), a depth sensor (e.g., stereo camera), an acceleration sensor, a gyro sensor, a magnetic field sensor, an optical sensor, a sound sensor, a distance measuring sensor, and a force sensor. Moreover, the input device 906 may acquire information associated with a state of the information processing apparatus 900 itself, such as a posture and a moving speed of the information processing apparatus 900, and information associated with an ambient environment of the information processing apparatus 900, such as brightness and noise around the information processing apparatus 900. Furthermore, the input device 906 may include a GNSS (Global Navigation Satellite System) module which receives a GNSS signal from a GNSS satellite (e.g., GPS (Global Positioning System) signal from a GPS satellite), and measures position information containing a degree of latitude, a degree of longitude, and a degree of altitude of the apparatus. In addition, concerning the position information, the input device 906 may detect a position by transmission and reception to and from Wi-Fi (registered trademark), a cellular phone, a PHS, a smartphone, or the like, or by near field communication or the like. For example, the input device 906 can constitute the sensor unit 230 depicted in FIG. 3.

The output device 907 is constituted by a device capable of visually or auditorily notifying the user of acquired information. Examples of this type of device include a display device such as a CRT display device, a liquid crystal display device, a plasma display device, an EL display device, a laser projector, an LED projector, and a lamp, an audio output device such as a speaker and a headphone, a printer device, and others. For example, the output device 907 outputs results obtained by various processes performed by the information processing apparatus 900. Specifically, the display device visually displays results obtained by various processes performed by the information processing apparatus 900 in various forms such as a text, an image, a table, and a graph. On the other hand, the audio output device converts an audio signal constituted by reproduced audio data, acoustic data, or the like into an analog signal, and auditorily outputs the analog signal. For example, the output device 907 can constitute the output unit 240 depicted in FIG. 3.

The storage device 908 is a device for data storage formed as an example of the storage unit of the information processing apparatus 900. For example, the storage device 908 is implemented in the form of a magnetic storage device such as an HDD, a semiconductor storage device, an optical storage device, and a magneto-optical storage device. The storage device 908 may include a storage medium, a recording apparatus which records data in a storage medium, a reading device which reads data from a storage medium, a deletion device which deletes data recorded in a storage medium, or the like. The storage device 908 stores programs executed by the CPU 901, various types of data, various types of data acquired from the outside, and the like. For example, the storage device 908 can constitute the storage unit 250 depicted in FIG. 3.

The drive 909 is a reader-writer for storage medium, and is built in or externally attached to the information processing apparatus 900. The drive 909 reads information recorded in an attached removable recording medium, such as a magnetic disk, an optical disk, a magneto-optical disk, and a semiconductor memory, and outputs the read information to the RAM 903. Moreover, the drive 909 is capable of writing information to the removable recording medium.

The connection port 911 is an interface connected to an external device, and is an external port connected to an external device and configured to transfer data via USB (Universal Serial Bus) or the like, for example.

For example, the communication device 913 is a communication interface constituted by a communication device or the like to connect to the network 920. For example, the communication device 913 is a communication card or the like for wired or wireless LAN (Local Area Network), LTE (Long Term Evolution), Bluetooth (registered trademark), or WUSB (Wireless USB). Moreover, the communication device 913 is a router for optical communication, a router for ADSL (Asymmetric Digital Subscriber Line), a modem for various types of communication, or the like. For example, the communication device 913 is capable of transmitting and receiving signals or the like between the communication device 913 and the Internet or other communication devices in accordance with a predetermined protocol such as TCP/IP. For example, the communication device 913 can constitute the antenna module 210 and the wireless communication unit 220 depicted in FIG. 3.

Note that the network 920 is a wired or wireless transmission path for information transmitted from a device connected to the network 920. For example, the network 920 may include a public network such as the Internet, a telephone network, and a satellite communication network, various types of LAN (Local Area Network) including Ethernet (registered trademark), and WAN (Wide Area Network). Moreover, the network 920 may include a dedicated network such as IP-VPN (Internet Protocol-Virtual Private Network).

An example of the hardware configuration capable of achieving functions of the information processing apparatus 900 according to the present embodiment has been described above. The respective constituent elements described above may be implemented using general-purpose members, or may be implemented by hardware specialized for functions of the respective constituent elements. Accordingly, the hardware configuration to be used is allowed to appropriately change according to a technical level of each occasion for practicing the present embodiment.

Note that a computer program for performing the respective functions of the information processing apparatus 900 of the present embodiment described above is allowed to be produced, and incorporated in a PC or the like. Moreover, a computer-readable recording medium storing this computer program is allowed to be provided. For example, the recording medium is a magnetic disk, an optical disk, a magneto-optical disk, a flash memory, or the like. Furthermore, the computer program described above may be distributed via a network, for example, without using a recording medium.

6. Summary

An embodiment of the present disclosure has been described above in detail with reference to FIGS. 1 to 10. As described above, the terminal apparatus 200 according to the present embodiment includes the one or more antenna modules 210. In addition, the terminal apparatus 200 controls the first process for changing a measurable direction while fixing a shield state of the antenna module 210 used for measurement as a state produced by a shield, and the second process for measuring downlink quality according to the change of the measurable direction. More simply speaking, while fixing the shield state of the antenna module 210 used for measurement as a state produced by the shield, the terminal apparatus 200 performs measurement every time the measurable direction changes. Because the shield state is fixed, a measurement result is not affected by the presence or absence of shielding produced by the shield. Accordingly, the terminal apparatus 200 achieves measurement while eliminating a shielding effect of a shield. The terminal apparatus 200 here controls the first process and the second process while fixing a state where the shield is not located in the measurable direction. In this manner, accurate measurement is achievable in a state where radio waves transmitted and received between the base station 100 and the terminal apparatus 200 are not shielded by the shield.

While the preferred embodiment of the present disclosure has been described above in detail with reference to the accompanying drawings, the technical scope of the present disclosure is not limited to this example. It is obvious that those having ordinary knowledges in the technical field of the present disclosure can occur to various modification examples and correction examples within the scope of the technical ideas described in the claims. Needless to say, it is understood that these modifications and corrections also fall within the technical scope of the present disclosure.

For example, while the embodiment has been described on an assumption that the proposed technology is applied to the first frequency range, the present technology is not limited to this example. For example, the proposed technology may be applied to the second frequency band.

Moreover, processes described with reference to the flowcharts and sequence charts in the present description are not necessarily required to be executed in the order presented in the figures. Several processing steps may be executed in parallel. Moreover, additional processing steps may be adopted, and a part of processing steps may be omitted.

Furthermore, a computer program for causing a processor (e.g., CPU, DSP, and BB (Baseband) processor) included in the device of the present description (e.g., base station, base station device, or module for base station device, or terminal apparatus or module for terminal apparatus) to function as the constituent element of the foregoing device (e.g., measurement control unit 261 and/or user support unit 263) (i.e., a computer program for causing the processor to execute operations of the constituent elements of the foregoing device) is allowed to be created. Moreover, a recording medium where the above computer program is recorded may be provided. Furthermore, a device including a memory storing the computer program, and one or more processors capable of executing the computer program (e.g., base station, base station device, or module for base station device, or terminal apparatus or module for terminal apparatus) may be provided. In addition, a method including operations of the constituent elements of the foregoing device (e.g., measurement control unit 261 and/or user support unit 263) is included in the technology of the present disclosure.

Besides, advantageous effects described in the present description are presented only for explanatory or exemplary purposes, and therefore are not limited advantageous effects. Accordingly, the technology of the present disclosure can offer other advantageous effect obvious for those skilled in the art in the light of the description of the present description in addition to or in place of the advantageous effects described above.

Note that following configurations belong to the technical scope of the present disclosure.

(1)

A terminal apparatus including:

one or more antenna modules; and a control unit that controls a process for changing a receivable direction of the antenna module used for measurement while fixing a shield state of the antenna module as a state produced by a shield, and a process for measuring downlink communication quality according to the change of the receivable direction of the antenna module used for the measurement.

(2)

The terminal apparatus according to (1) described above, in which the control unit performs a process for changing the receivable direction of the antenna module used for the measurement while fixing a state where the shield is not located in the receivable direction of the antenna module used for the measurement.

(3)

The terminal apparatus according to (2) described above, in which the shield is a body of a user of the terminal apparatus, and the control unit causes an output unit to output first instruction information for instructing the user to change the receivable direction of the antenna module used for the measurement while fixing the shield state of the antenna module.

(4)

The terminal apparatus according to (3) described above, in which the first instruction information includes information indicating arrangement of the antenna module in the terminal apparatus.

(5)

The terminal apparatus according to (3) or (4) described above, in which the first instruction information includes information indicating the antenna module used for the measurement.

(6)

The terminal apparatus according to any one of (3) to (5) described above, in which the first instruction information includes information indicating the receivable direction of the antenna module used for the measurement.

(7)

The terminal apparatus according to any one of (3) to (6) described above, in which the first instruction information includes information indicating a direction in which the receivable direction of the antenna module used for the measurement is to be set.

(8)

The terminal apparatus according to any one of (1) to (7) described above, in which the control unit causes a storage unit to store a combination of information indicating a result of the measurement and information indicating a measurement environment.

(9)

The terminal apparatus according to (8) described above, in which the information indicating the result of the measurement includes information indicating communication quality for each reception beam and information indicating the receivable direction of the antenna module used for the measurement.

(10)

The terminal apparatus according to (8) or (9) described above, in which the information indicating the measurement environment includes at least any one of position information associated with the terminal apparatus at the time of the measurement, configuration information associated with the terminal apparatus, and identification information associated with the antenna module used for the measurement.

(11)

The terminal apparatus according to any one of (8) to (10) described above, in which the control unit causes the storage unit to store a combination of information indicating a state that the measurement is not performed and information indicating the measurement environment for a direction in which the measurement is not performed.

(12)

The terminal apparatus according to any one of (8) to (11) described above, in which the control unit causes the output unit to output second instruction information that includes information generated on the basis of information stored in the storage unit, and indicating a direction in which a receivable direction of the antenna module used for data communication is to be set.

(13)

The terminal apparatus according to (12) described above, in which the direction in which the receivable direction of the antenna module used for the data communication is to be set is a direction indicated by a result of the measurement as a direction in which preferable communication quality is obtained.

(14)

The terminal apparatus according to (12) described above, in which the direction in which the receivable direction of the antenna module used for the data communication is to be set is a direction indicated by a result of the measurement as a direction in which less variable communication quality is obtained.

(15)

The terminal apparatus according to any one of (12) to (14) described above, in which the second instruction information includes information for instructing the user to shift to a position at which the user is to be located at the time of the data communication.

(16)

The storage unit according to any one of (12) to (15) described above, in which the second instruction information is generated also on the basis of information stored in the storage unit and obtained by the measurement performed by another terminal apparatus.

(17)

The terminal apparatus according to any one of (1) to (16) described above, in which:
- the terminal apparatus includes an apparatus capable of changing a posture; and
- the control unit changes the receivable direction of the antenna module used for the measurement by controlling the posture of the terminal apparatus.

(18)

The terminal apparatus according to any one of (1) to (17) described above, in which the control unit measures communication quality in a higher frequency band than a predetermined frequency.

(19)

The terminal apparatus according to (18) described above, in which the predetermined frequency is 6 GHz.

(20)

A method executed by a terminal apparatus that includes one or more antenna modules, the method including:
- controlling a process for changing a receivable direction of the antenna module used for measurement while fixing a shield state of the antenna module as a state produced by a shield, and a process for measuring downlink communication quality according to the change of the receivable direction of the antenna module used for the measurement.

REFERENCE SIGNS LIST

1: System
10: Cell
11: Transmission beam
12: Reception beam
13: Measurable direction, data communicable direction
20: Core network
30: PDN
100: Base station
200: Terminal apparatus
210: Antenna module
220: Wireless communication unit
230: Sensor unit
240: Output unit
250: Storage unit
260: Control unit
261: Measurement control unit
263: User support unit

The invention claimed is:

1. A terminal apparatus, comprising:
one or more antenna modules;
an output unit; and
a control unit, wherein the control unit is configured to:
control a first process that changes a receivable direction of an antenna module of the one or more antenna modules, wherein
the antenna module is configured to measure a downlink communication quality while a shield state of the antenna module is fixed, and
the shield state of the antenna module is a state produced by a shield;
control a second process that measures the downlink communication quality based on the change of the receivable direction of the antenna module configured to measure the downlink communication quality; and
cause the output unit to display first instruction information that instructs a user to change a data communicable direction of the antenna module and set the data communicable direction in a target direction, wherein
the first instruction information includes a first element that indicates the receivable direction and a second element that indicates the target direction,
based on the change of the receivable direction, a position of the first element shifts to align with a position of the second element,
the data communicable direction is for data communication, and
the target direction is a direction of a preferable downlink communication quality, and
the target direction is indicated based on information that indicates a result of a measurement of the downlink communication quality.

2. The terminal apparatus according to claim 1, wherein the control unit is further configured to perform the first process that changes the receivable direction of the antenna module configured to measure the downlink communication quality while a first state of the antenna module is fixed, and
the first state of the antenna module is a state where the shield is not located in the receivable direction of the antenna module configured to measure the downlink communication quality.

3. The terminal apparatus according to claim 2, wherein the shield is a body of the user of the terminal apparatus, and
the control unit is further configured to cause the output unit to output second instruction information that instructs the user to change the receivable direction of the antenna module configured to measure the downlink communication quality while the shield state of the antenna module is fixed.

4. The terminal apparatus according to claim 3, wherein the second instruction information includes information that indicates arrangement of the one or more antenna modules in the terminal apparatus.

5. The terminal apparatus according to claim 3, wherein the second instruction information includes information that indicates the antenna module configured to measure the downlink communication quality.

6. The terminal apparatus according to claim 3, wherein the second instruction information includes information that indicates the receivable direction of the antenna module configured to measure the downlink communication quality.

7. The terminal apparatus according to claim 3, wherein the second instruction information includes information that indicates a direction in which the receivable direction of the antenna module configured to measure the downlink communication quality is to be set.

8. The terminal apparatus according to claim 1, wherein the control unit is further configured to cause a storage unit to store a combination of the information that indicates the result of the measurement and information that indicates a measurement environment.

9. The terminal apparatus according to claim 8, wherein the information that indicates the result of the measurement includes information that indicates a communication quality for each reception beam and information that indicates the receivable direction of the antenna module configured to measure the downlink communication quality.

10. The terminal apparatus according to claim 8, wherein the information that indicates the measurement environment includes at least one of position information associated with the terminal apparatus at a time of the measurement of the downlink communication quality, configuration information associated with the terminal apparatus, and identification information associated with the antenna module configured to measure the downlink communication quality.

11. The terminal apparatus according to claim 8, wherein the control unit is further configured to cause the storage unit to store a combination of information that indicates a state that the measurement of the downlink communication quality is not performed and information that indicates the measurement environment for a direction in which the measurement of the downlink communication quality is not performed.

12. The terminal apparatus according to claim 8, wherein the control unit is further configured to cause the output unit to output the first instruction information that includes information generated based on information stored in the storage unit.

13. The terminal apparatus according to claim 1, wherein
the target direction is a direction in which a least variable communication quality is obtained, and
the direction in which the least variable communication quality is obtained is indicated based on the information that indicates the result of the measurement.

14. The terminal apparatus according to claim 1, wherein the first instruction information further includes information that instructs the user to shift to a position at which the user is to be located at a time of the data communication.

15. The terminal apparatus according to claim 12, wherein the first instruction information is further generated based on the information stored in the storage unit and obtained based on the measurement of the downlink communication quality performed by another terminal apparatus.

16. The terminal apparatus according to claim 1, wherein
the terminal apparatus further includes an apparatus configured to change a posture, and
the control unit is further configured to change the receivable direction of the antenna module configured to measure of the downlink communication quality based on control of the posture of the terminal apparatus.

17. The terminal apparatus according to claim 1, wherein the control unit is further configured to measure a communication quality in a frequency band higher than a specific frequency.

18. The terminal apparatus according to claim 17, wherein the specific frequency is 6 GHz.

19. A method executed by a terminal apparatus that includes one or more antenna modules, the method comprising:
controlling a first process for changing a receivable direction of an antenna module of the one or more antenna modules, wherein
the antenna module is configured to measure a downlink communication quality while a shield state of the antenna module is fixed, and
the shield state of the antenna module is a state produced by a shield;
controlling a second process for measuring the downlink communication quality based on the change of the receivable direction of the antenna module configured to measure the downlink communication quality; and
displaying first instruction information that instructs a user to change a data communicable direction of the antenna module and set the data communicable direction in a target direction, wherein
the first instruction information includes a first element that indicates the receivable direction and a second element that indicates the target direction,
based on the change of the receivable direction, a position of the first element shifts to align with a position of the second element,
the data communicable direction is for data communication, and
the target direction is a direction of a preferable downlink communication quality, and
the target direction is indicated based on information that indicates a result of a measurement of the downlink communication quality.

* * * * *